(12) United States Patent
Perez

(10) Patent No.: US 12,442,354 B2
(45) Date of Patent: *Oct. 14, 2025

(54) BUOYANT POWER SYSTEM METHOD AND APPARATUS

(71) Applicant: Four Electrons LLC, Tampa, FL (US)

(72) Inventor: John Scott Perez, Tampa, FL (US)

(73) Assignee: Four Electronics LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/973,958

(22) Filed: Dec. 9, 2024

(65) Prior Publication Data

US 2025/0101940 A1    Mar. 27, 2025

Related U.S. Application Data

(60) Continuation of application No. 18/375,673, filed on Oct. 2, 2023, now Pat. No. 12,173,680, which is a continuation of application No. 17/389,266, filed on Jul. 29, 2021, now Pat. No. 11,795,902, which is a division of application No. 16/171,128, filed on Oct. 25, 2018, now Pat. No. 11,105,313.

(60) Provisional application No. 62/577,135, filed on Oct. 25, 2017.

(51) Int. Cl.
| | |
|---|---|
| F03B 13/10 | (2006.01) |
| F03B 17/02 | (2006.01) |
| H02K 7/18 | (2006.01) |
| H02K 53/00 | (2006.01) |
| H02J 7/00 | (2006.01) |

(52) U.S. Cl.
CPC .............. *F03B 13/10* (2013.01); *F03B 17/02* (2013.01); *H02K 7/1823* (2013.01); *H02K 7/1853* (2013.01); *H02K 53/00* (2013.01); *F05B 2210/401* (2013.01); *F05B 2220/61* (2013.01); *F05B 2240/40* (2013.01); *F05B 2240/95* (2013.01); *H02J 7/0013* (2013.01); *Y02E 60/36* (2013.01)

(58) Field of Classification Search
CPC .... H02K 53/00; H02K 7/1823; H02K 7/1853; F03B 13/10; F03B 17/02
See application file for complete search history.

(56) References Cited

U.S. PATENT DOCUMENTS

| | | | | |
|---|---|---|---|---|
| 3,754,147 | A  * | 8/1973 | Hancock | ................. F04F 99/00 290/1 R |
| 2015/0033717 | A1* | 2/2015 | Hsu | ........................... F03G 7/05 60/325 |

* cited by examiner

*Primary Examiner* — Sean Gugger
(74) *Attorney, Agent, or Firm* — John L. Doughty; Doughty Law, L.L.C.

(57) ABSTRACT

A system in a water body uses buoyant force of gaseous Hydrogen and Oxygen to generate electrical power with one or more turbines that includes power resulting from the buoyant force while transporting the Hydrogen or Oxygen to a higher elevation, without loss of electrons, for conversion to electricity at the higher elevation. Conversion of Hydrogen and Oxygen to water through a Hydrogen Fuel Cell or by burning at the higher elevation may generate additional steam power, hydropower, or purified water. Portable submersible modules may transport the system below or above the water to and from the base of a plumbing portion of the system. The amount of gaseous fuel energy available at the higher elevation is not detrimentally impacted by the generation of electricity by the turbine.

20 Claims, 15 Drawing Sheets

BUOYANT POWER SYSTEM METHOD AND APPARATUS

CROSS REFERENCE TO RELATED APPLICATION

This application claims priority under 35 U.S.C. 119(e) to U.S. provisional patent application No. 62/577,135 entitled "Buoyant power system method and apparatus," which was filed Oct. 25, 2017, and which is incorporated herein by reference in its entirety.

FIELD

The field relates, generally, to energy and power production, and more specifically to harnessing and extracting energy from buoyant force of gas produced by a Hydrogen and Oxygen separator.

BACKGROUND

Classical power systems involve the use of nuclear or carbon-based fuels. There are some natural geothermal, solar, wind, and hydro power systems that are limited to land-based implementations but they are not plentiful enough to solve the world's power demand. The cost of traditional power systems and the waste produced by these systems have created the need for better power methods. Power systems using nuclear fuels produce nuclear waste that has to be stored in such a way to protect humans and the environment from radioactive materials. Power systems that leverage carbon-based fuels produce $CO_2$, poly aromatic hydrocarbons, and other carbon-based waste that has also been found to be detrimental to humans and the environment.

Numerous geopolitical pressures amongst nations of the world impact the ability to produce power from carbon-based fuels. These include sanctions, embargoes, terrorism, wars, and economic pressures. The issues go beyond availability of resources. Natural catastrophes such as drought, hurricanes, flooding, tidal waves, and earthquakes have damaged traditional power systems causing them to go offline for extended periods of time. The use of power on the oceans is dominated by carbon-based fuels except in exclusive areas where militaries have exploited nuclear power. The demand for power has increased as a result of a global population increase that has exponentially caused a demand for power thanks to accessibility of new technologies that require power to enable them. These technologies range from transportation, smart infrastructure, healthcare, retail, industrial, consumer & home, to other emerging technologies. All of these factors have created the need for scalable clean power methods to meet the demands of the growing world population.

SUMMARY

A system converts gravitational force acting on water into buoyant Hydrogen and Oxygen gas forces below the surface of a body of water allowing the buoyant flow of the gases to generate turbine power from the buoyant force as the gases rise to the higher elevations where the gases may be used as a fuel to create electricity, thermal power, or hydro power. Hydrogen produced from the system may be used in combustible fuel methods by diluting the Hydrogen with non-combustible or combustible gases to reduce the burn rates to that of the desired combustible fuel for use in the combustible fuel system. The system may also convert gravitational force acting on air into buoyant Hydrogen and Oxygen gas to cause buoyant flow of the gas in an upward direction. The Hydrogen and Oxygen separator may be located in water such that water molecules from the body of water the Hydrogen and Oxygen separator is located in are separated into Hydrogen and Oxygen molecules, respective Hydrogen and Oxygen separators either discharging into a plumbing system that contains water or into a plumbing system that does not contain water.

Hydrogen produced from the system may be combined with Oxygen from atmospheric air to create electricity in a Hydrogen Fuel Cell at higher elevations than where the Hydrogen originated from.

Hydrogen may be used as a fuel source in conjunction with Oxygen produced by the system, or from atmospheric air, to provide electricity and heat to acid-catalyzed olefin methods such as Fischer-Tropsch, Sabatier plus Fischer-Tropsch, and other Gas-To-Fuel methods to reduce process costs.

Hydrogen produced by the system may use acid-catalyzed inorganic methods such as Fischer-Tropsch, Sabatier plus Fischer-Tropsch, and other Gas-To-Fuel methods to produce acidic protons that can be used to reduce process costs.

In an aspect, the turbine power created by the system may be used to assist charging of batteries that power the buoyant power subsystems, which may include an Oxygen and Hydrogen separator such as a water hydrolysis device, for example a proton exchange membrane device ("PEM").

An aspect includes transporting electrons via buoyant Hydrogen and Oxygen gases long distances, for example from an elevation below the surface of an aqueous body of water to a higher elevation such as a location on a mountain at an elevation higher than the surface of the aqueous body of water such that electrons that are liberated by an Oxygen and Hydrogen separator are not lost to thermal heat and are recovered in a Hydrogen fuel cell with efficiency potentially as high as 99%.

In an aspect, a system converts gravitational force acting on water into buoyant force acting on Hydrogen and Oxygen gases at a depth in a large body of water that are burned and combined with pure water from reverse osmosis process at the same depth to generate steam that rises in a plumbed structure to produce thermal power, hydro power, or pure water.

In an aspect, a system converts gravitational force acting on water into buoyant force acting on Hydrogen and Oxygen gases at a depth in a large body of water that are burned and combined with pure water from reverse osmosis to generate steam that rises in a plumbed structure to produce thermal power and release water vapor into the atmosphere that can condense in the upper atmosphere to produce precipitation in the form of dew, rain, hail, or snow.

In an aspect, increasing the number of PEMs in one or more Hydrogen and Oxygen separators amplifies buoyant forces of gases produced thereby and directed into an intake of, or a manifold that couples to an intake of, a Hydrogen or Oxygen receiver of a buoyant power system.

An aspect amplifies the output of a buoyant power system configuration by increasing the number of buoyancy force engines, for example turbines, through interconnected plumbing that routes multiple gas flows from one or more Hydrogen and Oxygen separators to one or more buoyancy force engines, which may be referred to as Hydrogen and/or Oxygen buoyancy engines, which may include one or more turbines.

An Aspect amplifies the output of a buoyant power system via multiple Hydrogen or Oxygen buoyancy engines.

An aspect includes portable modular submersible structure that houses n+1 Proton Exchange Membrane(s), reverse osmosis sections, or power subsystems of a buoyant system that couples with an intake of a Hydrogen or Oxygen receiver. In an aspect, the submersible structure may include a propulsion system for moving the structure below the surface of a body of water it may be submersed in. Movement of the submersible structure may be remotely controlled via control signal conductors that run at least partially in a plumbing portion. In an aspect, a larger aerodynamic submersible structure that contains n+1 submersible slave structures may be connected to a master submersible structure with power and propulsion that can move the entire assembled structure of master and slave structures.

In an aspect, the submersible structure may be capable of being disassembled into subcomponents that fit together in a complementary fashion such that in disassembled kit form, they form a compact unit footprint the subcomponents of which are designed to complementarily fit with each other for storage or transportation. In an aspect, a submersible structure can be tethered to a ship or submersible watercraft located at the surface or below. In an aspect, a submersible structure can operate in a spread apart configuration where the subcomponents are interconnected. In an aspect, a submersible structure may include a submersible module to dynamically power or charge n+1 Hydrogen & Oxygen generating subcomponent modules while in spread out configuration.

In an aspect, the system is configured to be portable. For example, the Hydrogen separator and a buoyancy engine may be portable as a unit.

In an aspect, the system can be used for synthetic hydropower. For example, if the Hydrogen separator is at ground level, or at a depth in a water body so that buoyancy can be used to extract energy caused by buoyant forces acting on Hydrogen or Oxygen generated by an Oxygen and Hydrogen separator, and the generated Hydrogen and Oxygen are directed via plumbing to a higher elevation, for example the top of a mountain at a latitude and longitude near the separator, the Hydrogen and Oxygen The systems can be modular and movable. This may be useful for creating Hydrogen at sea from mobile electrical sources, such as a nuclear submarine.

In an aspect, a system comprises a Hydrogen receiver having an intake and having a discharge, wherein the intake is coupled to a Hydrogen output of a Hydrogen and Oxygen separator. The Hydrogen receiver may include a pipe coupling, or an interface with a flared opening on one end, for interfacing with a discharge side of a Hydrogen and Oxygen separator device that produces Hydrogen gas such as, for example, a proton exchange membrane (may also be referred to as polymer-electrolyte membrane) device ("PEM"). The system may also comprise a Hydrogen buoyancy engine having an intake and having a discharge, wherein the intake of the Hydrogen buoyancy engine is coupled to the discharge of the Hydrogen receiver, wherein the Hydrogen buoyancy engine is motivated by a Hydrogen buoyancy force of Hydrogen received from the Hydrogen discharge of the Hydrogen receiver, and wherein the Hydrogen buoyancy engine includes a Hydrogen energy convertor that converts motion of the Hydrogen buoyancy engine caused by the Hydrogen buoyant force into electrical energy. In an aspect, the Hydrogen buoyancy engine may be a turbine and Hydrogen energy convertor may be an electric generator.

The system may further comprise a Hydrogen delivery plumbing section having an intake and having a discharge, wherein the intake of the Hydrogen delivery plumbing section is coupled to the discharge of the Hydrogen buoyancy engine. For example, the Hydrogen delivery plumbing section may include piping that connects to the discharge of a housing that includes the turbine, or blades of the turbine.

In an aspect, the Hydrogen delivery plumbing section extends upward from the discharge of the Hydrogen buoyancy engine at a first elevation to the discharge of the Hydrogen delivery plumbing section at a second elevation, wherein the second elevation of the discharge of the Hydrogen delivery plumbing section is higher than the first elevation of the discharge of the Hydrogen buoyancy engine. As an example, the first elevation may be at or below the surface of a body of water that a PEM is in, and the second elevation may be at the top of a hill, mountain, or structure that is proximate the body of water that the PEM, Hydrogen receiver, and Hydrogen buoyancy engine are submersed in. In an aspect, instead of proximate the body of water, the second elevation may be a hill, mountain, or structure located a substantially elevated horizontal distance (i.e., horizontal being an orientation relatively parallel with the water surface) from the Hydrogen engine, and the plumbing may include substantial horizontal piping that carries Hydrogen gas from a first latitude and longitude of the Hydrogen engine to a second latitude and longitude that is the substantial horizontal distance from the first latitude and longitude.

In another aspect, the system may comprise an Oxygen receiver having an intake and having a discharge, wherein the Oxygen receiver intake is coupled to an Oxygen output of the Hydrogen and Oxygen separator, and an Oxygen buoyancy engine having an intake and having a discharge, wherein the intake of the Oxygen buoyancy engine is coupled to the discharge of the Oxygen receiver, wherein the Oxygen buoyancy engine is motivated by an Oxygen buoyant force of Oxygen received from the Oxygen discharge of the Oxygen receiver.

The Oxygen buoyancy engine comprises an Oxygen energy convertor that converts motion of the Oxygen buoyancy engine caused by the Oxygen buoyant force into electrical energy. In this aspect, the Oxygen receiver and Oxygen buoyancy engine may comprise similar structure as the similarly-labeled Hydrogen components.

In an aspect, the Oxygen buoyancy engine and Hydrogen buoyancy engine may be mechanically coupled so that the motion of the Oxygen buoyancy engine caused by the Oxygen buoyant force is added to the motion of the Hydrogen buoyancy engine caused by the Hydrogen buoyant force such that the Hydrogen energy convertor (which may be referred to as an Oxygen/Hydrogen convertor in this embodiment) coupled to the Hydrogen buoyancy engine simultaneously converts motion of the Hydrogen engine caused by the Hydrogen buoyant force and motion of the Oxygen engine caused by the Oxygen buoyant force into electrical energy. An example may be a shaft that couples a Hydrogen buoyancy engine with an Oxygen buoyancy engine. The shaft may couple the Hydrogen and buoyancy engines via a gear reducer, via a gear differential, or via a clutched system such that a speed of both the Hydrogen buoyancy engine and the speed of the Oxygen buoyancy engine match the speed of the coupling shaft.

In an aspect, the Hydrogen engine includes a Hydrogen turbine located in the Hydrogen receiver such that a flow of Hydrogen gas received from the Hydrogen and Oxygen separator impinges on the Hydrogen turbine and causes the Hydrogen turbine to spin based on the Hydrogen buoyant force.

In an aspect, an internal surface of either the Hydrogen receiver or the Oxygen receiver may define spiral vanes or rifling at a pitch that matches a design speed of Hydrogen gas or Oxygen gas rising in the respective receivers such that the rising gases are already moving in a spiral or circular motion that matches the pitch and design rotational speed of respective Hydrogen or Oxygen turbine blades in respective Hydrogen or Oxygen buoyancy engines.

In an aspect, the Oxygen engine includes an Oxygen turbine located in the Oxygen receiver such that a flow of Oxygen gas received from the Hydrogen and Oxygen separator impinges on the Oxygen turbine and causes the Oxygen turbine to spin based on the Oxygen buoyant force.

In an aspect, the Hydrogen and Oxygen separator includes a PEM device.

In an aspect, a system converts gravitational force acting on water into one or more buoyancy-motivated flows of Hydrogen or Oxygen gas in a body of water and that directs at least one of the one or more buoyancy-motivated flows of gases to a turbine via one or more components of a plumbing system to generate power from at least one of the one or more buoyancy motivated flows of the gasses. Components of the plumbing may direct one or more of the flows of gases to one or more turbines that may compose one or more Hydrogen energy convertors/buoyancy engines. Plumbing components that direct Hydrogen gas and Oxygen from an Oxygen and Hydrogen separator (i.e., a PEM) to Hydrogen and Oxygen buoyancy engines, respectively, may be referred to as Hydrogen and Oxygen receivers, respectively. The turbines may be coupled to generators, or similar types of devices, that convert rotational motion into electrical energy. Thus, energy that results from buoyancy force of gas as it rises in a plumbing component and is introduced into an intake of the Hydrogen or Oxygen energy convertors/engines is captured. A benefit of such a system where a PEM, or other type of device that receives and uses electrical energy to separate Hydrogen and Oxygen of water molecules and outputs the same, is located at a depth in water and where the buoyant force of rising Hydrogen or Oxygen gas, whether rising in water or rising in air or atmosphere, is that providing or 'pumping' electrons (i.e., supplied form a commercial or private electrical power grid) into the PEM uses the same amount of energy whether the 'pumped' electrons are generated at substantially the same elevation as the PEM or whether the electrons are 'pumped' to a lower elevation than where they were generated (i.e., to an elevation lower than the elevation of the grid or power plant.) Thus, by locating a PEM at a depth in water provides a benefit of capturing energy generated by buoyant force of gas rising in the water where the energy to operate the PEM is not substantially more than would be used if the PEM were used to capture and store, to use, or to distribute Hydrogen as a fuel at substantially the same elevation as the PEM.

The buoyant, rising gas, may continue to rise and be introduced into intakes of multiple stages of Hydrogen or Oxygen energy convertors, and may ultimately rise to a high elevation, such as a mountain or structure proximate a body of water that the gas is rising in, for conversion into electrical energy via burning or via combining (i.e., Hydrogen and Oxygen combining at the high elevation) for use as a hydropower source and the resultant water descends from the high elevation to a hydro turbine that is located below the high elevation and that may be located close to the water surface from which the Hydrogen originally came from.

In an aspect, buoyancy-motivated gases rise via the plumbing system from a first elevation to a third elevation that is higher that an elevation of the turbine(s), which is/are at a second elevation, wherein the gases are used as a fuel at the third elevation for the generation of one or more of electrical power, thermal power, or hydro power.

In an aspect, Hydrogen may be produced from the system at an efficiency that allows it to be used in combustible fuel methods by diluting the Hydrogen with non-combustible or combustible gases to reduce the burn rate of the combined gases to a burn rate that is similar to a burn rate of a desired combustible fuel that is not Hydrogen.

In an aspect, Hydrogen produced by the system may be combined with Oxygen from atmospheric air to create electricity in a Hydrogen fuel cell at higher elevations than where the Hydrogen was liberated from Oxygen of water molecules in a water body.

In an aspect, Hydrogen produced by the system may be used as a fuel source in conjunction with Oxygen generated by the system or in conjunction with Oxygen from atmospheric air to provide electricity and heat to acid-catalyzed olefin methods such as Fischer-Tropsch, Sabatier plus Fischer-Tropsch, and other gas-to-fuel methods to reduce the synthetic fuel production process costs. After buoyant force of Hydrogen has been used to generate electricity with a Hydrogen buoyancy engine, the Hydrogen may be directed via piping into a process for producing synthetic fuels.

In an aspect, Hydrogen produced by the system is used with acid-catalyzed inorganic methods such as Fischer-Tropsch, Sabatier plus Fischer-Tropsch, and other gas-to-fuel methods to produce acidic protons and heat that can be used to reduce the synthetic fuel production process costs. After buoyant force of Hydrogen has been used to generate electricity with a Hydrogen buoyancy engine, the Hydrogen may be directed via piping into a process for producing synthetic gaseous based fuels that have burn rates similar to propane, butane, natural gas, etc.

In an aspect, turbine power created by the system may be used to charge batteries that power the buoyant power subsystems. For example, in an aspect, energy generated from buoyancy force of Hydrogen gas rising in the plumbing components may be use to add charge to batteries that power a PEM that separates Hydrogen from Oxygen such that power from an external source, other than electricity produced from the buoyant force, is not used. Thus, even if an external source of electricity used to power the PEM is lost, the PEM may continue to operate for a self-produced-energy period without dropout, shut down, reduced Hydrogen power output, or other type of fluctuation of Hydrogen output.

In an aspect, electrons may be transported via buoyant Hydrogen or Oxygen gases for distances that may range from depths in aqueous bodies of water to higher elevations such that the electrons are not lost and are recovered in a Hydrogen fuel cell with high efficiency.

In an aspect, a system that converts the gravitational force acting on water into buoyant Hydrogen and Oxygen gas forces at a depth in a large body of water are burned and combined with pure water from reverse osmosis process at the same depth to generate steam that rises in a plumbed structure to produce thermal power, hydro power, and pure water.

In an aspect, a system converts the gravitational force acting on water into buoyant Hydrogen and Oxygen gas forces at a depth in a large body of water that are burned and combined with pure water from reverse osmosis to generate steam that rises in a plumbed structure to produce thermal power and release water vapor into the atmosphere that condenses in the upper atmosphere to produce precipitation in the form of dew, rain, hail, or snow.

A method of amplifying a buoyant power system configuration by increasing the number of Proton Exchange Membranes, which may provide Hydrogen to a Hydrogen receiver. The Hydrogen receiver may be merely a pipe or may be another type of plumbing component that couples the output of the PEM to an intake of a Hydrogen engine, which may include a turbine that rotationally couples to a generator.

In an aspect, generation of electricity from buoyancy force is amplified by increasing a number of buoyant engine stages through interconnected plumbing with each successive buoyancy engine stage at a higher elevation than a previous buoyancy engine stage.

In an aspect, generation of electricity from buoyancy force may be amplified by using multiple buoyant engines at a given stage (i.e., a given elevation in a plumbing system). For example, multiple buoyant engines may be coupled to a shaft that drives a generator, wherein each buoyant engine receive a gas from a separate corresponding receiver, such as a Hydrogen and/or Oxygen receiver. Each receiver may receive its corresponding gas from a separate PEM or from a branch from a manifold that splits a gas flow from a single PEM into multiple gas flows.

In an aspect, one or more portable modular submersible structures may each house one or more (i.e., n+1) proton exchange membrane devices, reverse osmosis devices, and power subsystems of a buoyant system and may be interchangeably attached at the base of the buoyant power system plumbing so that a number of, or size of, a modular portable structure can amplify the amount of energy produced from buoyant force from a buoyant engine.

In an aspect the submersible structure may have a propulsion system, which may, or may not, receive power generated from buoyancy engines. In an aspect, a large aerodynamic submersible structure that contains n+1 submersible structures may be connected to another submersible structure that includes power and propulsion systems that can move the entire assembled structure, which may include the large aerodynamic submersible structure and the n+1 submersible structures. The combined large structure and n+1 structures may be disassembled into the subcomponents, or sub structures. The submersible structure may be tethered to a ship or submersible watercraft located at the surface, or that is located below the surface of a water body. The structures may be configured to function in a spread apart configuration where the subcomponents are interconnected. The structures may have a submersible module dynamically power or charge n+1 Hydrogen & Oxygen generating subcomponent modules while in spread out configuration.

In an aspect, a method comprises producing a Hydrogen gas flow at a first elevation, wherein the Hydrogen gas is produced at a first pressure, providing the gas flow to a Hydrogen buoyancy engine at a second elevation that is higher than the first elevation, performing a first amount of work with the Hydrogen buoyancy engine based on the Hydrogen gas flow, wherein the pressure of the Hydrogen gas flow provided to the Hydrogen engine at the second elevation is a second pressure that is higher than the first pressure due at least to buoyant force acting on the Hydrogen gas between the first elevation and the second elevation. Instead of Hydrogen gas, the gas may be Oxygen.

The Hydrogen gas flow may be produced by a Hydrogen and Oxygen separator device, such as a PEM or similar device, that receives an electrical input and also has a water source at a water input and separates the constituent Hydrogen and Oxygen from the water molecules. Electrons from the electrical input are added to the separated Hydrogen and Oxygen so that the chemical reaction that occurs in the Hydrogen and Oxygen separator is balanced.

The Hydrogen buoyancy engine may be a turbine, which may be mechanically coupled via rotational shaft to an electric generator. The electric generator may be referred to herein as a converter, or a hydrogen energy convertor. The first elevation may be below a surface of a water body. The second elevation of the hydrogen engine, or turbine, may be above but almost at the surface elevation of the water. The work performed at the second elevation may be mechanical work, i.e., the rotational shaft of the turbine performs some kind of work or as an input to a device that operates and are rotational manner. Or, the work performed at the second elevation may be electrical work, i.e., the rotation motion of a turbine turning an electric generator which produces electric energy or electric power and delivers the electric power to an electrical load.

The hydrogen engine, or turbine, may be partially motivated to rotate due to buoyant force acting on the Hydrogen gas rising from the first elevation to the second elevation. It will be appreciated that the output of the hydrogen and oxygen separator typically produces Hydrogen and Oxygen gas flows having a substantial pressure (i.e. about 1100 psi using a PEM). Gas flowing from a Hydrogen and Oxygen separator at such a pressure would motivate a turbine to turn as the gas flow impinges on the blades of the turbine. By locating the turbine at an elevation higher than the elevation where the Hydrogen or Oxygen gas that impinges on it are produced, not only does the pressurized gas flow that results from the output of a Hydrogen and Oxygen separator turn the turbine but buoyant force acting on the Hydrogen or Oxygen gas rising from the first elevation to the second elevation adds to the force that turns the engine, or turbine. Gas that is output from the Hydrogen and Oxygen separator is typically directed to the turbine via a piping or plumbing system. A component of the plumbing system that couples the Hydrogen output of the Hydrogen and Oxygen separator to an input of the turbine may be referred to herein as a Hydrogen (or Oxygen) receiver. The Hydrogen receiver may simply comprise a short piece of pipe with flanges on either end that fasten to complimentary flanges at a Hydrogen output of a Hydrogen and Oxygen separator and to an input, or intake, of the turbine. The plumbing system may carry gas that discharges from the turbine to a higher third elevation.

At an output of the turbine the plumbing system may continue to carry rising Hydrogen and Oxygen gas to a third elevation. The turbine typically will cause a reduction in pressure of a flow of Hydrogen that passes through the turbine as it performs work, but all of the Hydrogen molecules that were presented at the input of the turbine will pass through the turbine and continue to rise in the plumbing structure to the third elevation where additional work may be performed, such as burning the Hydrogen in a steam power generation system. Alternatively, a Hydrogen Fuel Cell system can be used to convert Hydrogen and Oxygen to electricity. Thus, energy of the gas flow as it flows upward to the turbine is captured by the turbine and used thereby. The energy of the rising flow of Hydrogen gas is partially due to the output force, or pressure, from the Hydrogen and Oxygen separator, but the energy captured is also partially due to buoyant force acting on the flow of hydrogen gas as it rises from the first elevation to the second elevation. Buoyant force acting on the flow of Hydrogen gas continues to push it to the third elevation without need of additional pumping.

The benefit and purpose of placing the Hydrolysis system at a depth below sea level is to leverage the water pressure at a substantial depth for Reverse Osmosis and buoyancy. Water pressure is used to convert saline water to pure water in an RO device. A reverse osmosis process may not be necessary in non-saline water bodies. Another reason and benefit for selecting a depth below sea level is to exploit the converted gravitational force acting on water when the covalent bonds with Hydrogen are switched off, thus harnessing buoyant force for capture by the system. The buoyant force has constant acceleration of the Hydrogen or Oxygen to the surface. There are thermodynamic conditions acting on Hydrogen or Oxygen as the gases rise causing them to warm and expand. This is of value to the system in terms of capturing work from thermal heating.

It will be appreciated that the system described above could operate if the first, second, and even third elevations were substantially similar due to output pressure from a Hydrogen and Oxygen separator having enough pressure to operate a turbine. An advantage of placing a Hydrogen and Oxygen separator at a lower elevation than the engine/turbine that captures buoyant force is that electricity that needs to be 'pumped' a distance in a conductor, for example from the second elevation to the first elevation, to operate the Hydrogen and Oxygen separator does not encounter any more electrical resistance going from the higher elevation to the lower elevation that it encounters traversing in the conductor same distance in a horizontal plane, but buoyant force acts on Hydrogen gas produced at the lower elevation from the same amount of electrical input and is captured with the engine/turbine when the engine is at a higher elevation than the elevation where the Hydrogen is produced. The cooled water environment is such that the conducting transmission lines used operate with greater efficiency than they do on land when they are heated by the sun and atmosphere.

In an aspect the first amount of work performed is electrical energy proportional to the second pressure of the Hydrogen gas flow. As discussed herein, an electrical generator may be coupled to an output shaft of the turbine that captures energy that is partially caused by buoyant force of a rising gas. Other forms of work performed by the turbine may include operating a pump or other rotational form of work that may be appropriate based on the location and surroundings of the turbine.

In an aspect, the method may further comprise directing the Hydrogen gas flow to a third elevation that is higher than the second elevation after the first amount of work is performed at the second elevation. At the third elevation a second amount of work may be performed based on the Hydrogen gas flow, which may rise to the third elevation from the turbine at the second elevation partially a result of pressure that remains after the gas passes through the turbine, and partially due to buoyant force that remains after the gas passes through the turbine as well as additional buoyant force as the gas continues to rise from the turbine at the second elevation to the third elevation.

The third amount of work will typically not be lower than it would have been had the first amount of work not been performed at the second elevation. In other words, even though pressure of gas rising in the plumbing will typically drop as the gas passes through the turbine, the same amount of hydrogen will typically arrive at the third elevation as was produced at the first elevation. Thus, if the work performed at the third elevation is the capturing or burning of Hydrogen, the same amount of Hydrogen, with the same amount of combustibility, arrives at the third elevation as was produced at the first elevation. However, due to the pressure drop across the turbine, the velocity of the gas flow as it rises from the second elevation after passing through the turbine may be less than the velocity before the first work was done at the second elevation. The pressure flow drop is countered by continual buoyant force pressure acting on the Hydrogen gas. Accordingly, even though the amount of second work performed at the third elevation may be the same as it would have been had the pressure of the gas flowing from the first elevation to the second elevation not been used to perform the first work, the rate (and power) at which the second work at the third elevation may be performed would typically be less than it would have been had pressure the gas flowing from the first elevation to the second elevation not been used to perform the first work at the second elevation. However, the buoyant force acting on the Hydrogen gas imposes constant acceleration to the rising gas.

In an aspect, the second amount of work performed at the third elevation may be electrical energy proportional the amount of Hydrogen gas molecules in the Hydrogen gas flow. For example, Hydrogen gas that has risen to the third elevation may be burned to produce heat, may be used to generate electricity in a fuel cell, or may be captured at the third elevation in a storage tank and used to fuel a combustion engine, fuel cell, etc. Such uses of the Hydrogen gas that rises to the third elevation may be considered examples of the second work referred to herein. Another form of the second work may be allowing Hydrogen gas that has risen there to combine with Oxygen in a Hydrogen fuel cell, such as Oxygen that may be in atmosphere where the Hydrogen is released at the third elevation, and the resulting water may be released from the third elevation into another plumbing system than the one that brought the Hydrogen gas to the third elevation and may turn a hydro turbine as the water is directed to a lower elevation by the force of gravity.

DETAILED DESCRIPTION

The following detailed description refers to the accompanying drawings. The same reference numbers in different drawings may identify the same or similar elements. The detailed description does not limit the invention.

As a preliminary matter, it will be readily understood by those persons skilled in the art that the present invention is susceptible of broad utility and application. Many methods, embodiments, and adaptations of the present invention other than those herein described as well as many variations, modifications and equivalent arrangements, will be apparent from or reasonably suggested by the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
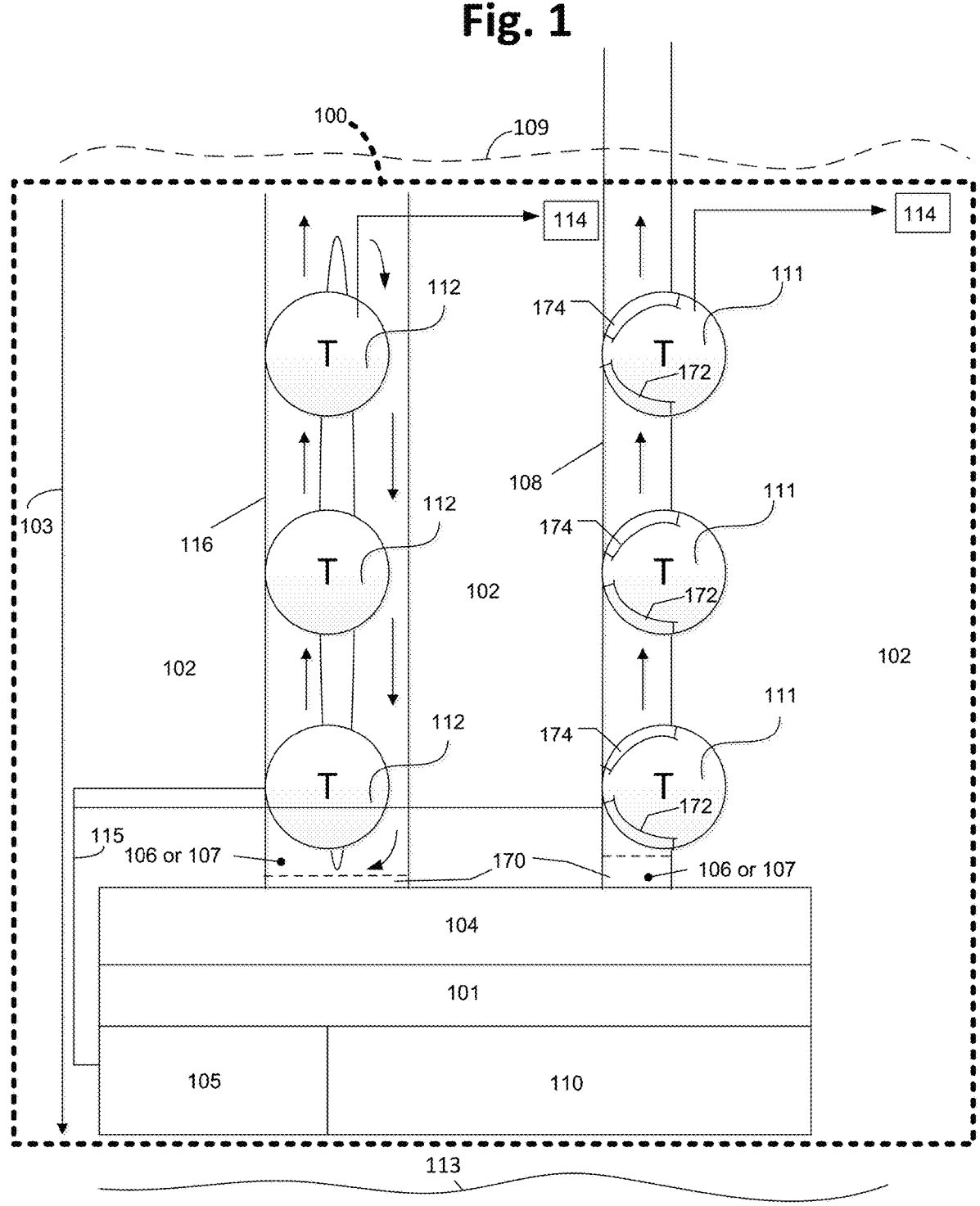
FIG. 1 is an illustration of a buoyancy power system engine (BPSE) embodiment that purifies water through reverse osmosis before it converts the gravity of water in an ocean, lake, or a body of water into the buoyant gases Hydrogen and Oxygen for the purpose of driving n+1 power turbines, recharging batteries, and transporting the gases to the surface of the aqueous body.

Systems and methods herein describe the buoyant power system engine (BPSE) 100 of FIG. 1. The BPSE is composed of a submersible structure that contains a Reverse Osmosis (RO) system 101. RO system 101 is capable of purifying water from aqueous solutions 102 that contain dissolved molecules such as salts using pressure. Pressure for RO system 101 comes from the force the mass of the aqueous solution exerted on the RO system. In FIG. 1 the BPSE is submerged in a body of water 102 such as the ocean or a lake at a depth capable of producing enough pressure to produce pure water via RO 101 on demand. The Force exerted on RO system 101 can be increased with depth 103 since the aqueous pressure on an object is increased with depth in an aqueous body such as the ocean.

Gravitational force on a body of water creates Pressure ($P=F/A$, where P is pressure, F is force, and A is area). The Force being $F=ma=mg$, where m is mass, a and g are the acceleration due to gravity. The deeper the ocean the greater the pressure and force of water that can be used to do work in purifying water using RO system 101. The BPSE uses RO system 101 to do work on an aqueous solution by purifying water. Saline & brine water with dissolved molecules has less thermal explosive energy than pure water. This is due to having less combustible Hydrogen & Oxygen atoms by volume. Contaminants in the saline water are preferably removed prior to working on the water molecules with the Proton Exchange Membrane (PEM) system 104. The PEM preferably uses pure water to avoid catalytic poisoning of the PEM by contaminants.

A typical PEM system uses 55 volts Direct Current (DC) and 1250 Amps of power. PEMs are not limited in DC range and can be built to specification for DC voltage & power consumption. The power source 105 of the BPSE can be any conventional power source that produces DC voltage and power capable of driving the PEM. Conventional power sources include nuclear, wind, solar, battery, etc. that are capable of producing electrical DC voltage to the PEM. The optimal use of re-chargeable battery power 105 may be used to optimize the efficiency and flexibility of the BPSE.

PEM 104 typically uses an inorganic metal catalyst (such as platinum, 316 stainless steel, etc.) to switch off the Hydrogen and Oxygen covalent bonds of the water molecule with efficiency close to 100%. This process requires 4 electrons per 2 water molecules and is defined by the Hydrolysis of Water reaction in eq. 1.

$$4e^- + 2H_2O \leftarrow \rightarrow 2H_2 + 2O \qquad \text{Eq. 1}$$

This is true at 1 atmosphere on land (i.e., Standard Temperature and Pressure (STP)). It is not true under the extreme pressure at very deep ocean depths when used to purify water from saline ocean water. Instead, the force of gravity that acts on the ocean water now comes into the stoichiometry of the chemical reaction and the chemical reaction changes to one that includes the energy from the gravitational Force ($F_g$) of water that becomes a buoyant force (Fe) during the electronic switch off of the covalent bonds between Hydrogen and Oxygen in the water molecule. At a depth 103 below the ocean surface the equation for hydrolysis must take into consideration the thermal energy put into the water by the RO process that involved the forces of the Earth's gravity acting on the water molecule. The reaction of RO plus Hydrolysis of Water at an ocean depth is:

$$4e^- + F_g + 2H_2O \leftarrow \rightarrow F_b + 2H_2 + 2O \qquad \text{Eq. 2}$$

The Hydrogen 106 and Oxygen 107 gases produced by the PEM have densities less than that of water or any aqueous solution making them buoyant at any ocean depth. Hydrogen also has a density substantially less than that of air and is also buoyant in air at any depth within the ocean and beyond the ocean's surface. The gravitational Force ($F_g$) that acts on ocean water mass at any depth has an acceleration of gravity that is 9.8 m/s². This gravitational force that pulls the ocean water acts on objects in the water with a force known as the buoyant force.

In FIG. 1 Hydrogen gas 106 or Oxygen gas 107 moves from PEM 104 at a gas output (either Hydrogen or Oxygen) of the PEM into a receiver 170. Only one receiver is shown in the figure, but it will be appreciated that separate receivers 170 may be used for Hydrogen and Oxygen gases discharged from the PEM. The Hydrogen or oxygen receiver 170 may be merely a section, or spool, of piping that connects a discharge of PEM 104 to an intake portion 172, represented schematically, of a hydrogen or oxygen energy engine 111, which is shown in the figure with a capital 'T' to indicate that a component of engine 111 is a preferably a turbine that converts buoyant force that is motivating gas 106 or 107 to rise in plumbing system 108. Engine 111 includes a discharge 174 that allows gas to continue to rise in plumbing 108 to an open end of plumbing or to an intake 172 of another engine 111 as shown in the figure. Gases 106 or 107 rise upwardly through plumbing 108 due to buoyant force so the acceleration of the rising gas in the water (or in the air in a scenario where turbines 11 and plumbing 108 is designed to operate without water in the plumbing) $a_i$ is designated as a positive value for reference herein. The buoyant force ($F_b$) can be computed using the formula $F_b = V_g \times D \times g$, where $V_g$ is the volume of the gas, D is the density of the liquid the gas is submerged in, and g is gravity. The density of sea water varies between 1020-1050 Kg/m³ from shallow warm water to deep cold water. A simple $F_b$ computation for a liter of gas (0.001 m³) is $F_b$=0.001 m³×1050 Kg/m³×9.81 m/s²=10.30 Kg/m²s²=10.30 Newtons. At a shallow depth in warmer sea water the $F_b$ is substantially 0.001 m³×1020 Kg/m³×9.81 m/s²=10.01 Kg×m/s²=10.01 Newtons. (Because the gas is compressible, this determination of $F_b$ is not exact because the volume of the gas decreases proportionally to the depth of the gas.) Acceleration due to gravity is 9.81 m/s². Thus, the buoyant force of seawater for 1 liter of Hydrogen or Oxygen gas ranges from −10.01-10.30 Newtons. Consequently, the buoyant force acting on 1 m³ or 1000 Liters, of gas would be between ~10,100-10,300 Newtons depending on the depth and warmth of the sea water.

This results in the ability of Hydrogen and Oxygen to accelerate through water as a gas from an ocean depth to the ocean surface at a rate greater than 9.8 m/s² (i.e., the gas rises in the water.) The density of Hydrogen (0.082 Kg/m³) is less than that of air (~1.225 Kg/m³ at sea level) at the ocean surface and the upper atmosphere. For example, the $F_b$ of Hydrogen could be calculated as $F_b$=1 m³*1.225 Kg/m³*9.81 m/s²=12.00 Kg×m/s²=12.00 Newtons. This means that Hydrogen can accelerate beyond the ocean surface into the upper atmosphere at a rate greater than 9.8 m/s². The observed accelerations from the buoyant force ($F_b$) act on the Oxygen & Hydrogen gases to move either or both of them upwardly in a system that receives the Oxygen and/or Hydrogen and which system may include turbines, impellers, or other similar modes of converting buoyant force acting on the upwardly rising gases into rotational energy.

Figure 3:
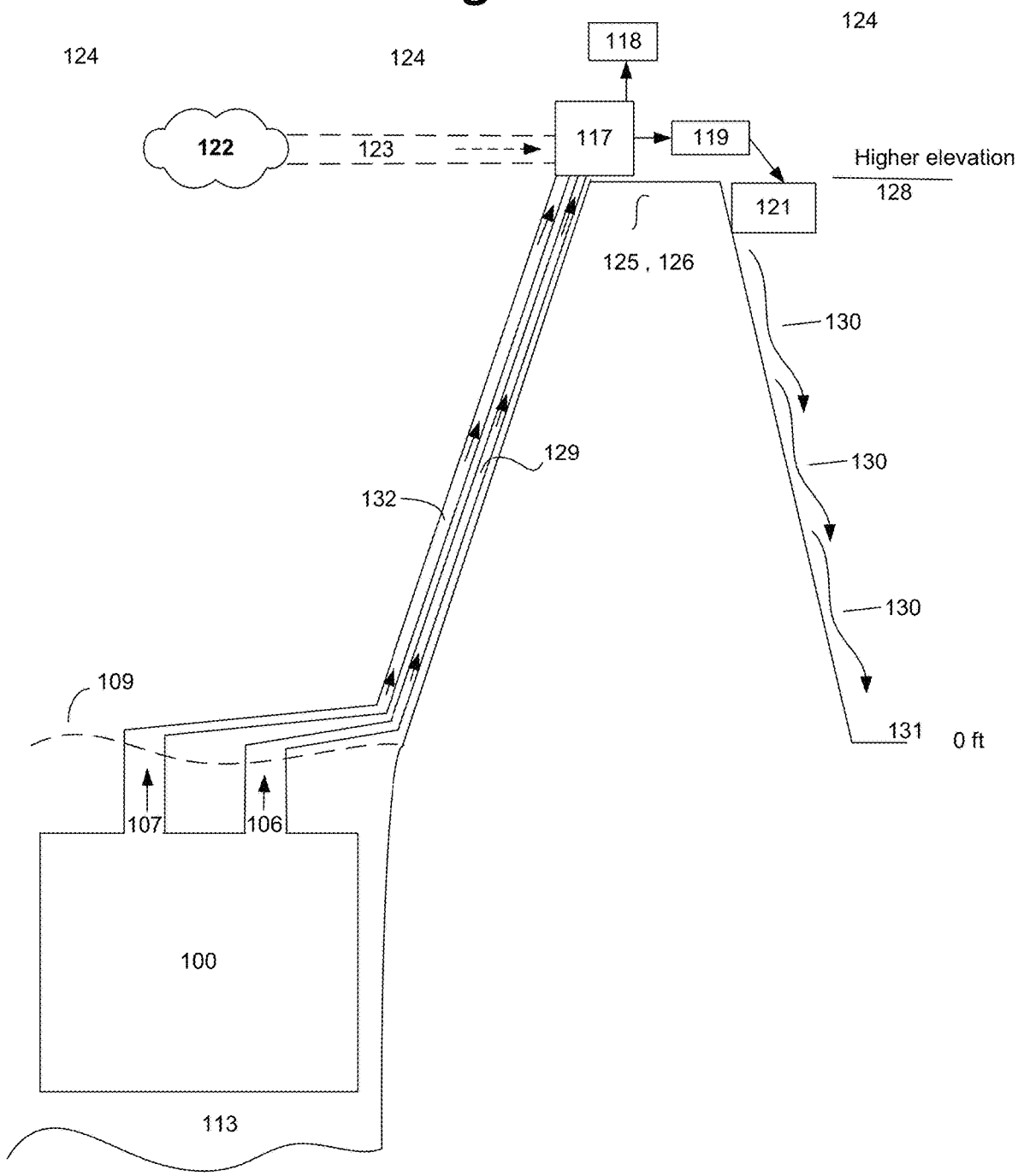
FIG. 3 is an illustration of a submerged buoyancy power system engine that recharges its batteries and transports the produced Hydrogen and Oxygen up an artificial or natural structure from a depth to a high elevation prior to using a Hydrogen fuel cell to create electricity and pure water. The pure water is placed in a reservoir and released to produce hydropower as it flows down the structure.

The method of transferring Hydrogen 107 and Oxygen 106 from an ocean depth directs the rising gas, or gasses, into the plumbing system 108 to direct the gases from an ocean depth to the surface of the ocean and may continue to direct the rising gases to an elevation higher than the surface of the ocean shown in FIG. 3. In the case of Hydrogen, plumbing 108 may direct Hydrogen flow to the surface 109. The Hydrogen plumbing could initially contain air, but would eventually be purged of air by upward pressurized flow of Hydrogen (the pressure being substantially a function of the production of Hydrogen by a PEM, but may also be partially the result of buoyancy acting on the Hydrogen). Plumbing material 108 is such that the path for Hydrogen to rise to the surface of the ocean is not crushed or collapsed by the pressure of the surrounding aqueous body that the BPSE resides in at depths. Reinforcement of the plumbing may be designed for the directing of Hydrogen generated at greater depths, which reinforcement designs may include internal pipe cross beams at greater depths, which may not only provide reinforcement but that may also provide interconnecting piping with valving that may be used to direct gas flow from more than one PEM to one or more turbines that may be coupled in a series fashion or the plumbing system may fan out at a more shallow depth to multiple turbines that may be at a given depth or elevation and that may have their output shafts rotationally coupled. The buoyant force (Fe) of Hydrogen can be used to drive n+1 turbines 111 as it rises to, and above, the ocean surface 109. The constant acceleration of the buoyant force exceeds the inertia and friction of, and acting upon, turbine 111 and accelerates the turbine to an angular momentum that is capable of producing power. Here some of the buoyant force (Fe) is converted into an electromotive force ($F_{emv}$) by the turbine which creates electrical power when the turbine is coupled to an electric generating device, such as a generator or alternator, or other similar mode for converting rotational motion into electrical energy.

In an example, Inertia (I) of a turbine may be defined by the formula $I=\frac{1}{2} mr^2$ for a cylindrical shaped turbine, where m is the mass of the turbine and r is the radius of the turbine arms. The angular momentum (p) of the turbine is defined as my, where m is the mass and v is the velocity. Rising gas motivated by buoyant force (Fe) impinges on the turbine to create angular momentum $F_b=p=mv$. The turbine's angular momentum is used in conjunction with a wired armature (e.g., an electric generator) that converts angular momentum into electricity having electromotive force ($F_{emv}$). The turbine power 115 at the lower ocean depths 103 can be used to charge batteries 105 that are used to power the Hydrogen generating portion of the BPSE (i.e., the power form the turbine/generator may be used to add charge to batteries 105 to beneficially extend the useful period of power delivery from the batteries because additional energy from another source is added to the batteries, or until the batteries are swapped for fully charged batteries. Additional power from turbines 111 may be transmitted downstream to be used by other electrical systems 114. Additional space for a manned control room with computer controls is available at 110.

Oxygen 107 may be pressurized during creation by PEM 104 and may be forced to the surface in the same manner as Hydrogen but with lesser buoyant force than acts on Hydrogen due to the density of Oxygen compared to the density of Hydrogen). However, Oxygen 107 is denser than air and water vapor, but lighter than water. Oxygen gases will float upward in plumbing 116 that has pure water in it due to the buoyant force (Fe) acting on Oxygen when in water. Gas creation and the use of pure water in the system allows for upward buoyant flow of Oxygen gas as it is produced. There are compression effects on gases at depths within large aqueous bodies. These are countered by continuous gas creation, for example by a PEM 104. PEM 104 typically produces an output pressure at a Hydrogen or Oxygen output of about 1,100 psi. Pressure from the output gas 106 or 107 may drive turbines/engines 111 or 112. Buoyant force as gases 106 or 107 rise in plumbing 108 imparts additional energy to the blades of turbine 111 when plumbing 108 is substantially vertical from an elevation of PEM 104 to an elevation of turbine 111 such that energy output of turbine 111 that is available to turn an energy converter, an electric generator for example, is higher than the energy output that would be available to turn the turbine's blades if the turbine and PEM were at substantially the same elevation because in the later scenario there would be substantially no buoyant force adding to the pressure of the gas at the input to turbine 111 if the input thereof is at the same elevation as the PEM.

Current produced by Oxygen 107 may be used to drive turbines 112 in the system 100 shown in FIG. 1. The electricity from the turbines may also be used to add charge 115 the batteries 105 of the BPSE or transmit energy 114 downstream for use elsewhere. A water-based plumbing and turbine current configuration 116 can also be used with Hydrogen and pure water plumbing. The terminal velocity of Hydrogen or Oxygen depends on the plumbing configuration. The force of drag is negligible on the gases Hydrogen or Oxygen in a plumbed environment without liquid.

In an aspect, turbines may be sized and spaced in the plumbing fabric according to depth in water, according to the terminal velocity of the gases, force of drag that may vary according to the density of the liquid the gases are rising in, the force of inertia of the turbines, and desired rotational speed of the turbine.

Figure 2:
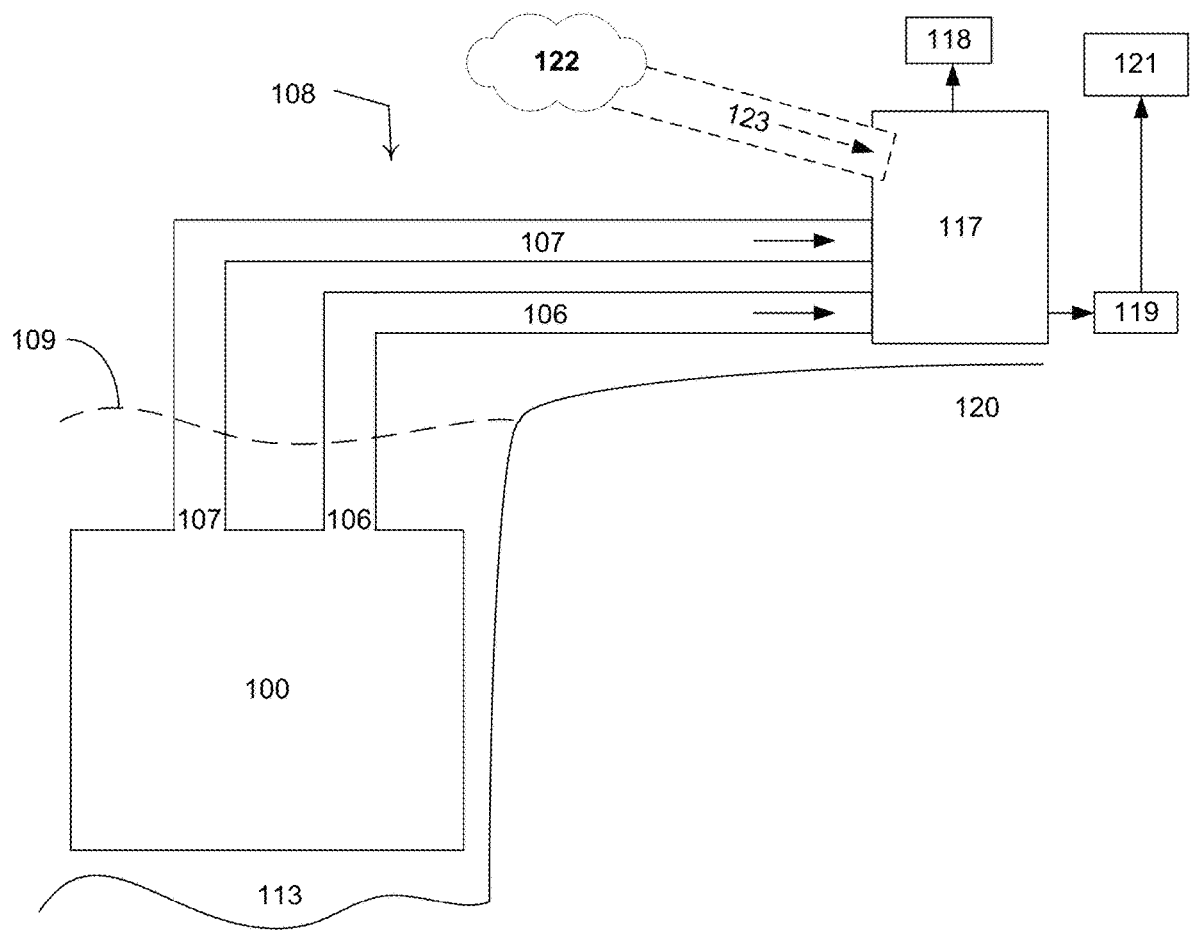
FIG. 2 is an illustration of a submerged buoyancy power system engine that recharges its batteries, transports Hydrogen and Oxygen to the surface, and uses a Hydrogen fuel cell to create electricity and pure water from Hydrogen and Oxygen at the surface of the aqueous body.

Turning to FIG. 2, Hydrogen and Oxygen in the BPSE can be brought to the ocean surface 109 from any depth in plumbing material that is pressure-resistant to the aqueous body of water that the BPSE 100 resides in due to the buoyant force ($F_b$). Furthermore, Hydrogen can be brought into the upper atmosphere due to this buoyant force as shown in FIG. 3. The Hydrogen & Oxygen captured at the ocean surface 109 can be passed over a Hydrogen Fuel Cell 117 to produce electricity 118 and water 119 as shown in FIG. 2. The Hydrogen Fuel Cell can be located on land or may be a floating object 120 at the ocean's surface. The re-formation of water has the reaction:

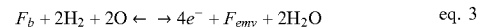

$$F_b + 2H_2 + 2O \leftarrow \rightarrow 4e^- + F_{emv} + 2H_2O \qquad \text{eq. 3}$$

Re-formation of water through the Hydrogen Fuel Cell 117 yields two water molecules and 4 electrons that can be used for direct current (DC) 118. The water molecules can be captured in reservoir 119 and used for consumption by humans or animals because the water is pure. The water may be filtered and antiseptic chemicals added thereto to prevent contamination of biologicals and toxins. The water can be used on the local water grid 121 for traditional potable water purposes. The ability to use the four electrons that were transferred from an ocean depth by the Hydrogen and Oxygen atoms in the plumbing results in a very efficient mode of transferring energy. There is no loss of electrons in transmission from any ocean depth using the BPSE Hydrogen and Oxygen plumbing and the total number of electrons transmitted from the ocean depth from the PEM of system 100 to a Hydrogen Fuel stack at a higher elevation than the PEM is conserved per the defined reaction:

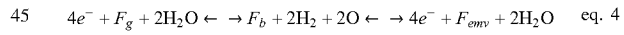

$$4e^- + F_g + 2H_2O \leftarrow \rightarrow F_b + 2H_2 + 2O \leftarrow \rightarrow 4e^- + F_{emv} + 2H_2O \qquad \text{eq. 4}$$

Use of Oxygen from the BPSE is optional at the surface of the ocean because air 122 contains ~20% Oxygen and can be used as the input 123 to the Hydrogen Fuel Cell if so desired as shown in FIG. 2.

Hydrogen is capable of traveling beyond the surface of the ocean into the upper atmosphere 124 due to the buoyant force in air 129 FIG. 3. Hydrogen flow 129 and Oxygen flow 132 can be plumbed upward along natural structures such as the sides of mountains 125 or artificial/man-made towers/structures 126 to higher elevation 128. This allows Hydrogen to be collected at an elevation high up (for example 1,000 ft) and converted to direct current electricity 118 and water 119 at that elevation with a Hydrogen Fuel Cell 117 using Oxygen 122 from the atmosphere 123 at the higher elevation. Oxygen can also be or pumped up 132 under creation pressure (i.e., output pressure from PEM generation) to higher elevation 128. Water can be created there and can be placed into a reservoir 121 at elevation 128. The water can be allowed to flow freely or controlled by control mechanisms 130 such, for example, one or more dams, one or more terraces, restrictive orifices in a descending plumbing system, and the like) from the reservoir back to a lower elevation such as sea level 131 thus producing hydro energy as the gravitational force accelerates the water down the structure 125/126. The purified water may be used for consumption, irrigation, or other uses. A benefit is that water pumping costs are reduced using this technique.

Figure 4:
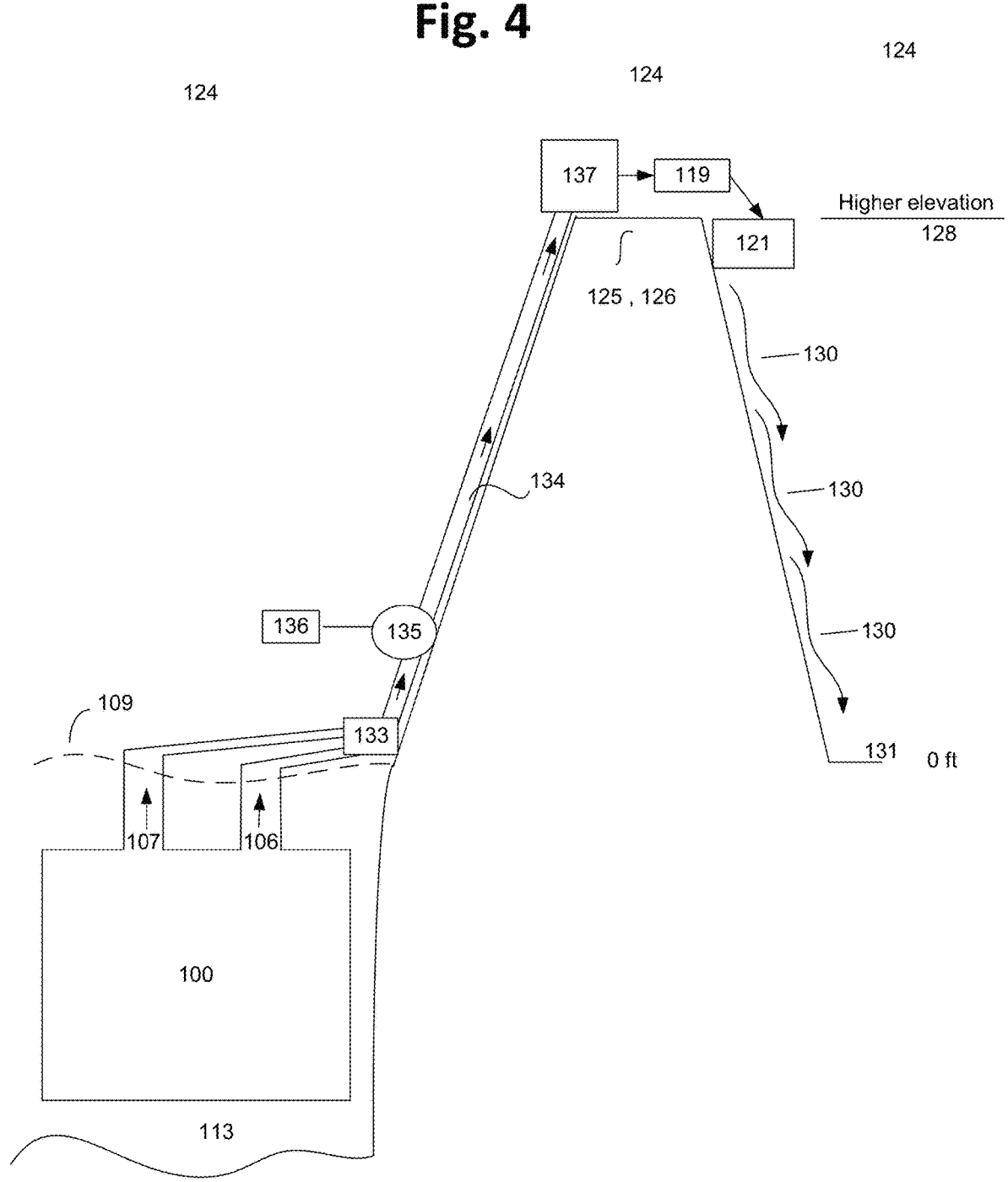
FIG. 4 is an illustration of a submerged buoyancy power system engine that recharges it's batteries and transports the Hydrogen and Oxygen to the surface where it is ignited to create steam that further drives a steam turbine and then rises up the side of an artificial or natural structure in plumbing to an elevation where the pure water is captured in a condenser and stored in a reservoir. The water in the reservoir is released down the structure to produce hydropower, irrigate, or feed the potable water grid.

A similar method shown in FIG. 4 can be used whereby the Hydrogen is burned 133 in the presence of Oxygen to create steam water vapor 134 that will drive a steam turbine(s) 135 to create power 136 and the steam vapor 134 continues to rise to the top of a mountain 125 or artificial structure 126 and condense in a condenser 137 to form water 119 at the top. The water can then be stored in a reservoir 121 at the elevation 128. The water can be allowed to flow freely or controlled via control mechanisms 130 from the reservoir to a lower elevation such as sea level thus producing more hydro energy as the gravitational force accelerates the water down the structure to sea level 131. The purified water may be used for consumption, irrigation, or other uses.

Figure 5:
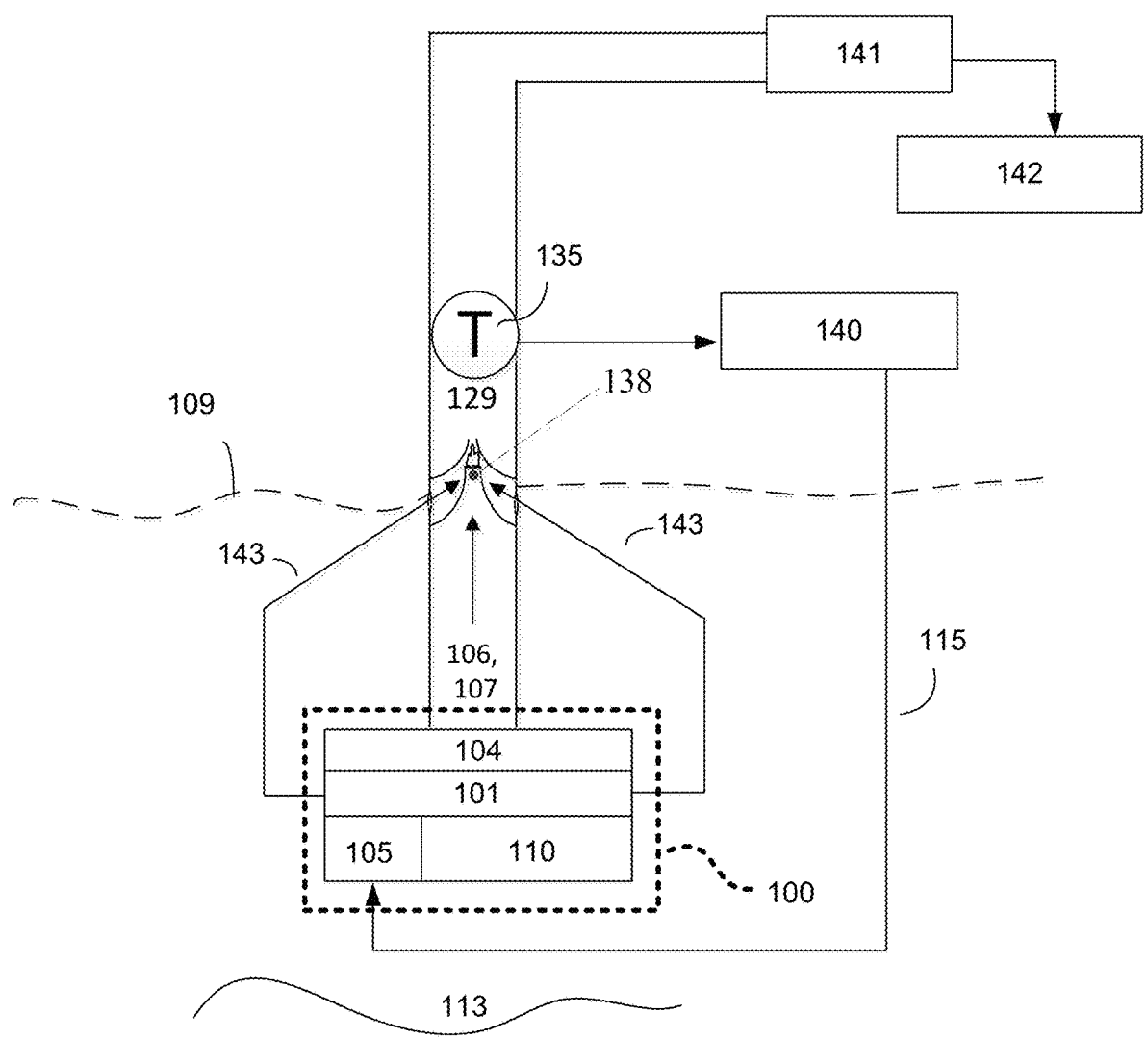
FIG. 5 is an illustration of a submerged buoyancy power system engine that produces Hydrogen and Oxygen that is transported to the surface and burned in the presence of water from reverse osmosis to produce steam that drives a steam turbine to create electricity for use to recharge the batteries of the buoyancy power system engine. Steam from the system is condensed into pure liquid water downstream and stored in a reservoir for distribution on the water grid.

Hydrogen 106 and Oxygen 107 from the BPSE 100 or Oxygen from air can be burned from a jet 138 at the ocean surface 109 as shown in FIG. 5 to generate steam 129 that can drive a steam-based turbine power system 135. The power from the traditional steam-based power system can be used on the power grid conventionally 140, and the water can be condensed by a condenser 141 into a reservoir 142 and used for consumption, irrigation, and other conventional uses because it is pure.

Turbine power can also be used to re-charge 115 the batteries 105. The BPSE creates an abundant amount of pure water by default because water is ultimately the byproduct of power generation in the BPSE. The ability to capture water in geographical regions while generating electricity is a benefit that may be used to reduce drought conditions in areas such as the Western United States. The ability to create water at high elevations that can serve as reservoirs allows the water to be distributed using the force of gravity. Water pumping costs are reduced using this strategy.

Figure 6:
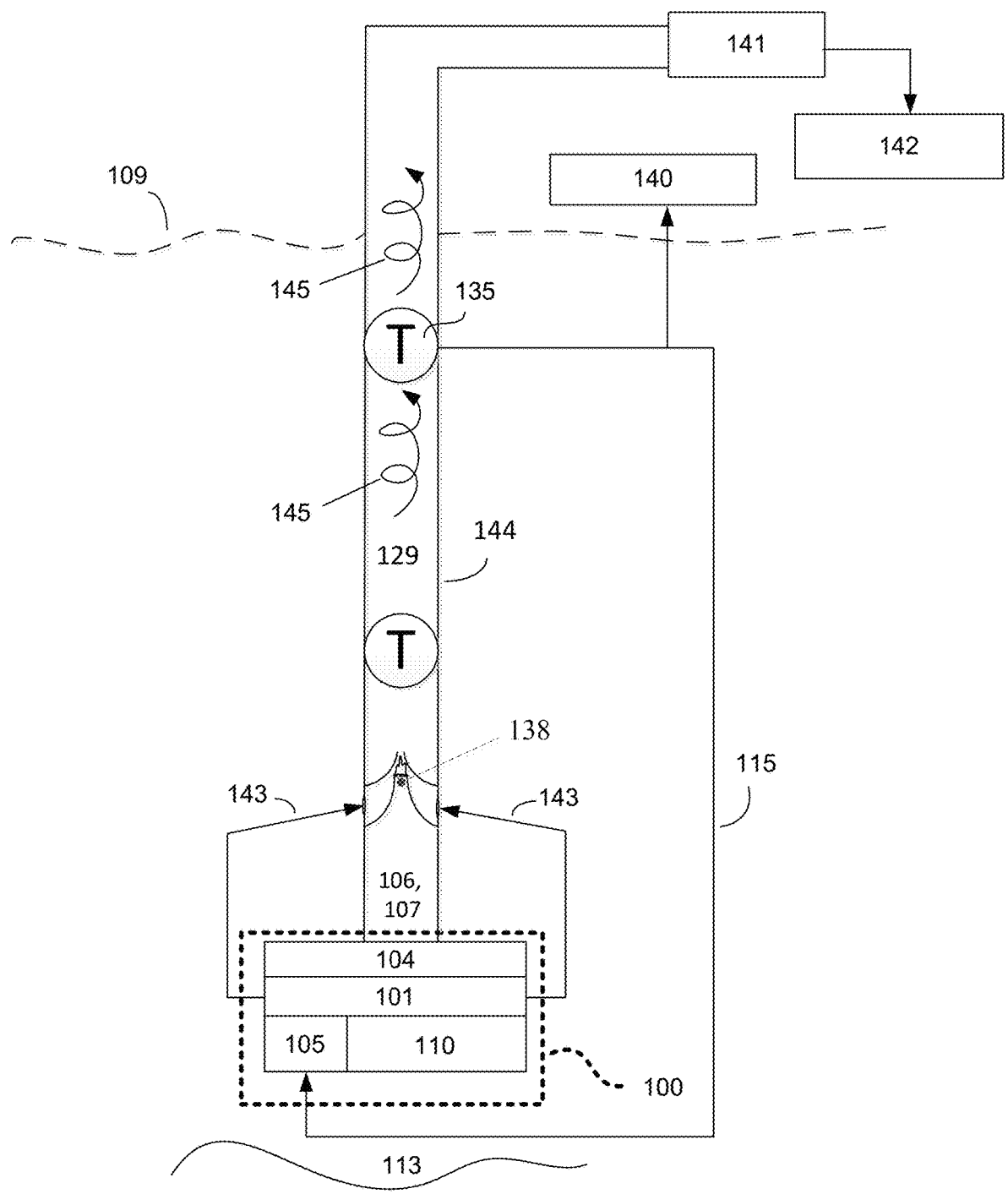
FIG. 6 is an illustration of a submerged buoyancy power system engine that produces Hydrogen and Oxygen at a depth that is burned in the presence of water added from reverse osmosis that generates a steam convection up the plumbing driving n+1 turbines that recharge the systems batteries and create power. Steam from the system is condensed into pure liquid water downstream and stored in a reservoir for distribution on the water grid.
Figure 7:
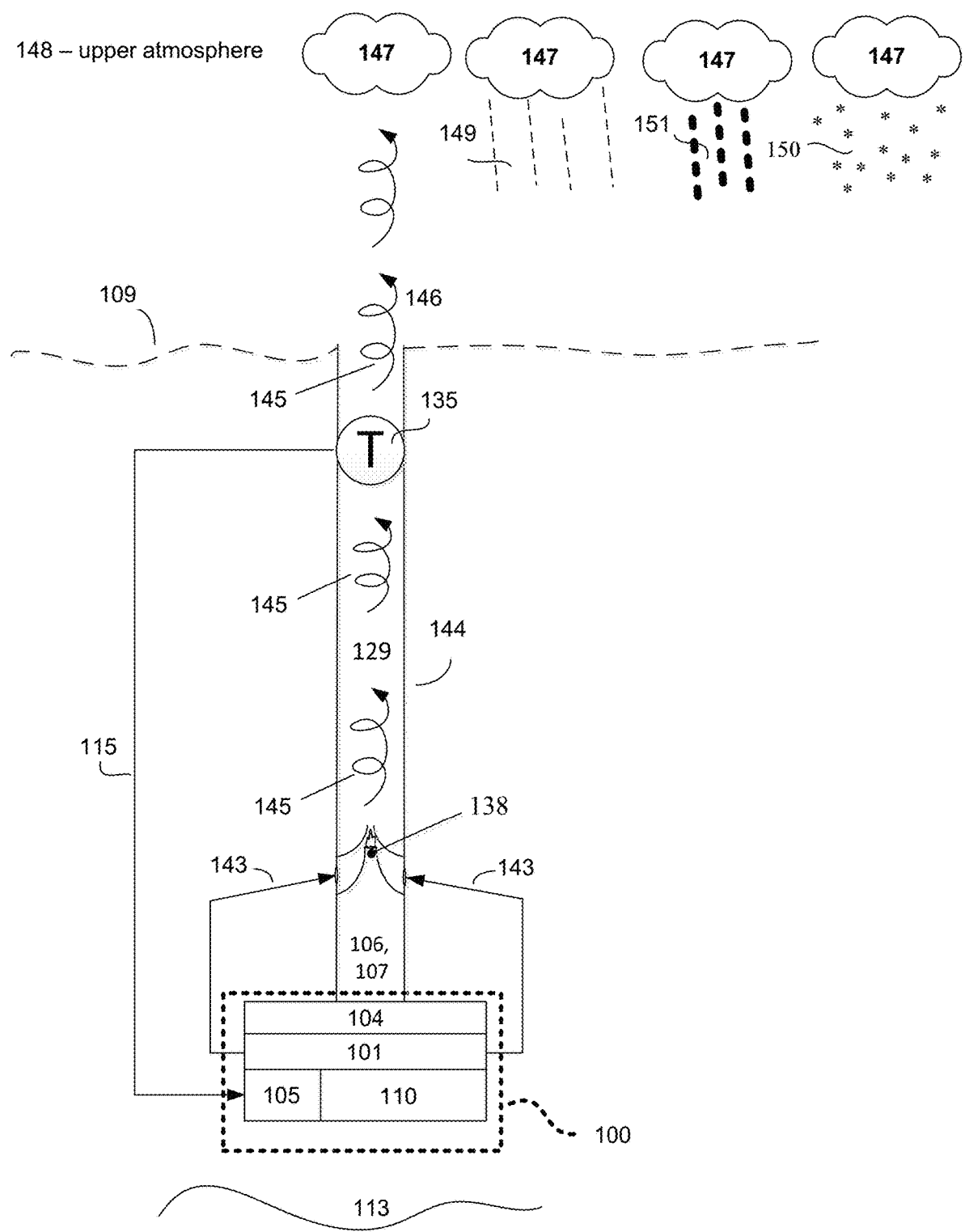
FIG. 7 is an illustration of a submerged buoyancy power system engine that produces Hydrogen and Oxygen at a depth that is burned in the presence of water added from reverse osmosis that generates a steam convection up the plumbing driving n+1 turbines that recharge the systems batteries and create power. Steam from the system is released into the atmosphere where it can condense in the upper atmosphere to produce dew, rain, hail, and snow.

The BPSE 100 can be modified in such a way to burn the Hydrogen 106 and Oxygen 107 produced by the PEM 104 using a jet system 138 at an ocean depth 113 as shown in FIG. 6. Water from RO system 101 can be injected 143 into the system to maximize the volume of water vapor 129 produced by the BPSE in the plumbing 144. The steam water vapor produced at a depth can be used to drive traditional steam turbine(s) 135 in FIG. 6 below the ocean's surface as the water vapor rises to produce power 140 just as it can be performed at the ocean's surface as shown in FIG. 5. Water can be condensed 141 and captured in a reservoir 142. The value of this process is that it allows the dielectric properties of the water vapor to create a cyclonic current 145 as it rises from beneath the ocean that create low pressures at the surface of the ocean. The cyclonic water vapor current 145 is clockwise in the Northern Hemisphere and counterclockwise in the Southern Hemisphere. These low pressures can contribute to furthering natural cyclonic water vapor behavior near the BPSE plumbing outlet 146 of the water vapor into the upper atmosphere when vented into the upper atmosphere as shown in FIG. 7. This case allows the water vapor to condense 147 in the upper atmosphere 148 and produce rain 149 naturally under atmospheric conditions that allow the water vapor to accumulate and condense in the upper atmosphere 148. In other colder atmospheric conditions snow 150 and hail 151 can be produced from the accumulation of water in the upper atmosphere under colder atmospheric temperatures. The cost of electrical power to the BPSE is reduced when the turbines are used add re-charge current 115 the batteries 105 used to power the BPSE 100 in FIG. 7. This water vapor configuration and any of the BPSE 100 plumbed configurations 152 can be amplified in an n+1 BPSE configuration with n+1 PEMs 153 FIG. 8A. More than one BPSE n+1 system can be placed nearby to amplify the output further 153 FIG. 8B and FIG. 8C.

Hydrogen does not pose a combustion leak threat in the BPSE plumbing at ocean depths because there is no Oxygen surrounding the Hydrogen plumbing to support combustion. Hydrogen use at sea level or higher elevations must use special plumbing to avoid leaks & combustions. Impermeable and bendable polymer-based plumbing is recommended. Hydrogen has a burn rate greater than methane, alcohol, gasoline, natural gas, propane, and diesel. These burn rates can be achieved with Hydrogen base stocks collected from the BPSE by diluting the Hydrogen to the respective burn rate with inert Nitrogen from air (78% Nitrogen), or purified Nitrogen from air. Hydrogen will not react with Nitrogen unless it is heated to 200° C. or greater under contained pressure. This means that Nitrogen diluted Hydrogen can be used in traditional carbon-based heating & combustion systems with lower burn rates than Hydrogen and Oxygen alone. These systems may include transportation, natural gas grids, power systems, etc. that are capable of using fuels with burn rates that are slower than that of pure Hydrogen. Power plants that use natural gas can be converted to Nitrogen diluted Hydrogen provided from the BPSE. Hydrogen can also be diluted with other combustible gases such as natural gas to adjust the burn rate to that of a carbon-based fuel. The key is to eliminate carbon from burning, so the dilution gas of choice is inert Nitrogen.

Hydrogen can be used as a heat source and feed stock into the acid catalyzed process known as Sabatier plus Fischer-Tropsch. This is a process whereby carbon material from pyrolysis or natural gas is used to create carbon-based fuels, lubricants, and waxes. Typically, these processes are inefficient because they use heat and acids to create the acid catalysis across an inorganic metal center. They are an option when the carbon-based fuels are not available for traditional distillation from crude oil. The BPSE provides Hydrogen fuel for heating and Hydrogen protons for acid catalysis in Sabatier plus Fischer-Tropsch process in an efficient manner to sea level or above geographies whereby the Gas to Fuel (GTF) cost methods can be brought down relative to the ones driven by natural gas heating. These are traditional Synthetic Fuel (Syn-Fuel) methods that are now conventionally used. Higher GTF yields are possible using Hydrogen for heating, electricity, and acid catalysis in the GTF process. These methods may be used in conjunction with the buoyancy engine that captures energy from buoyant force as discussed herein and wherein the capture of energy from buoyant force does not impose a detriment to these other methods as compared to a system where hydrogen is produced but energy from buoyant force is not captured.

Figure 8A:
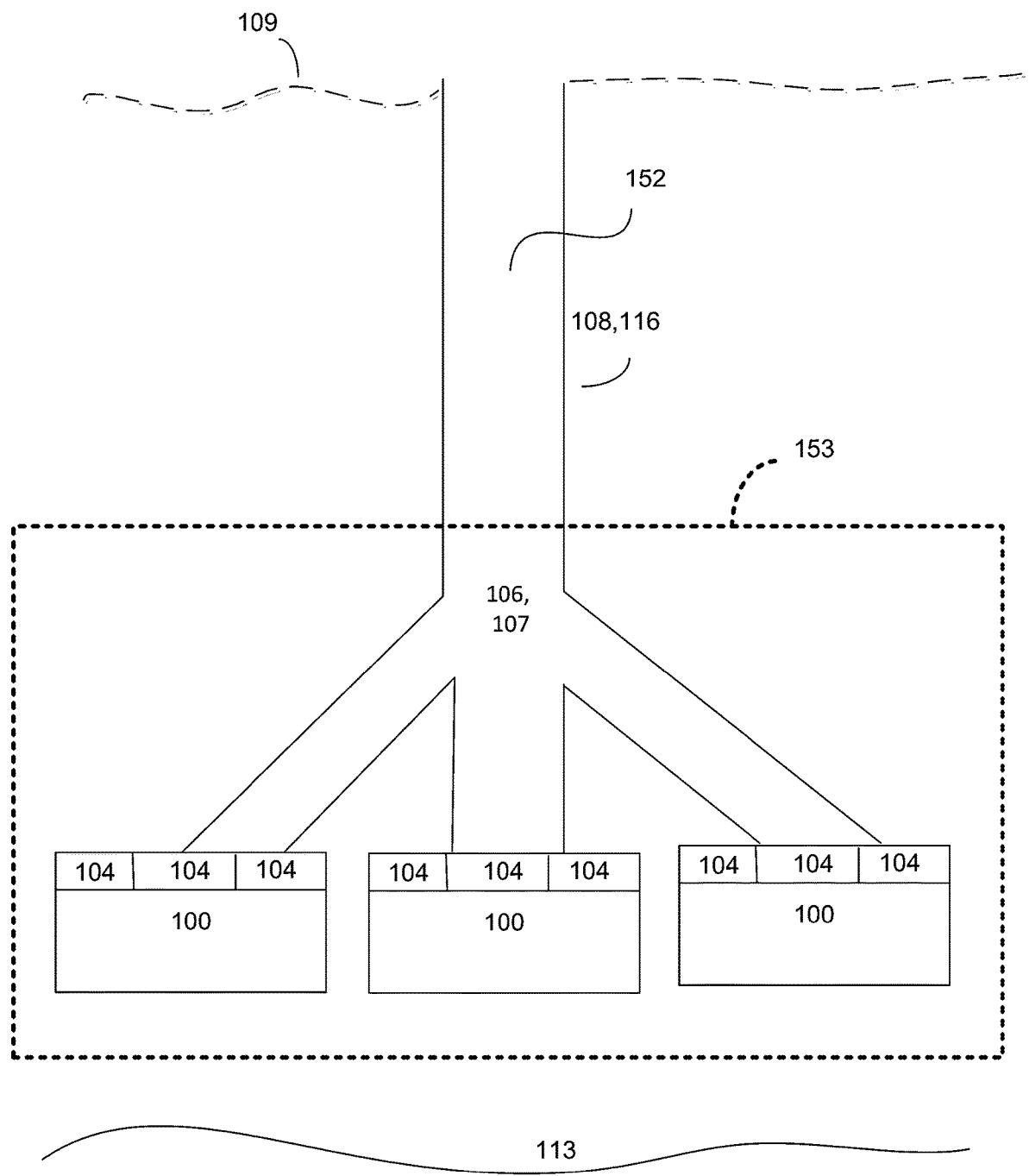
FIG. 8A is an illustration of a submerged buoyancy power system that leverages n+1 buoyancy power system engines that have n+1 Proton Exchange Membranes (PEM). This diagram uses 3 PEMs per a BPSE and shows 3 BPSEs in an interconnected configuration to amplify Hydrogen and Oxygen output to the surface.
Figure 8B:
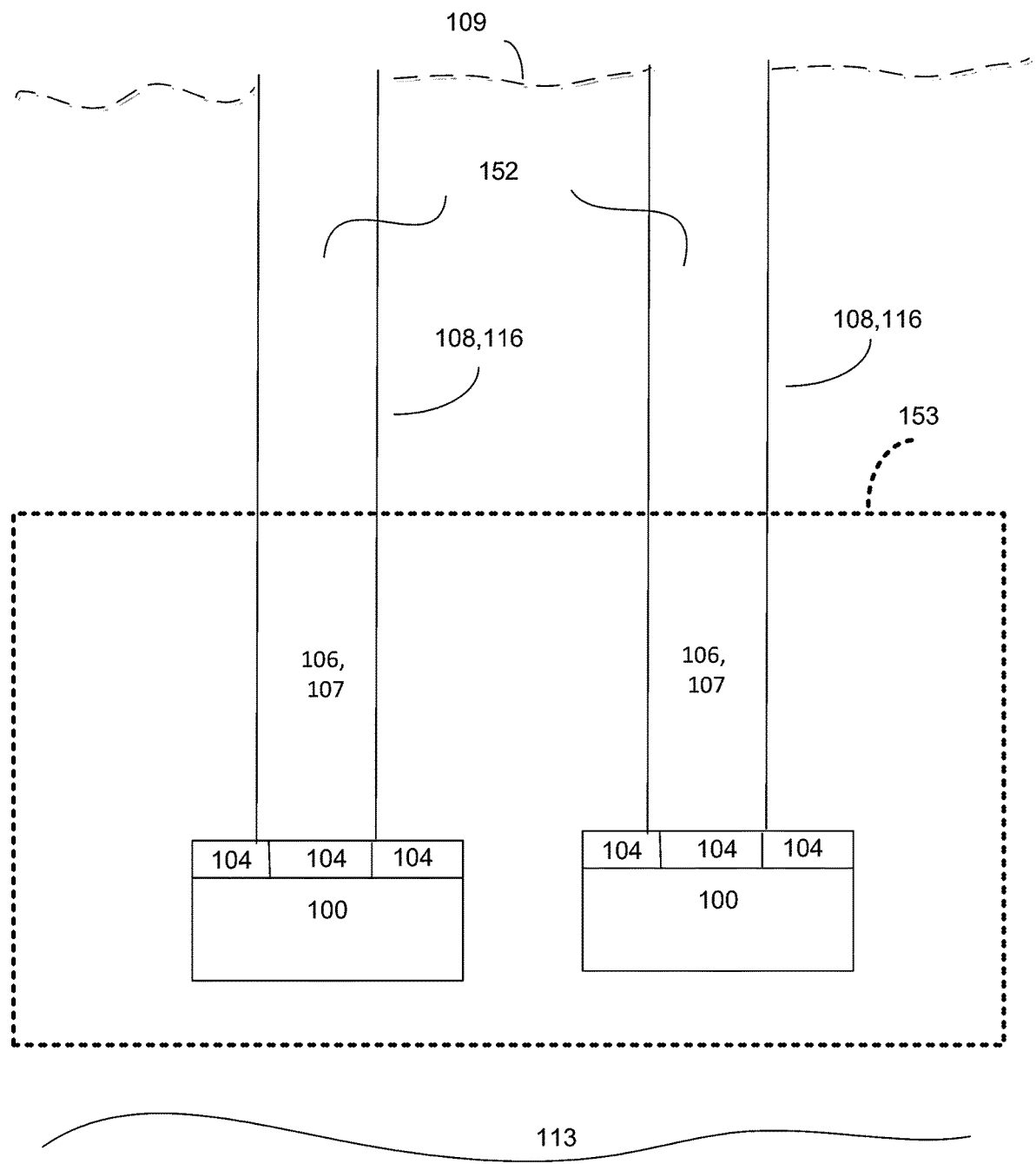
FIG. 8B is an illustration of a submerged buoyancy power system that leverages n+1 buoyancy power system engines that have n+1 Proton Exchange Membranes (PEM). This diagram uses 3 PEMs per a BPSE and shows 2 BPSEs in a parallel configuration to amplify the Hydrogen and Oxygen output to the surface.
Figure 8C:
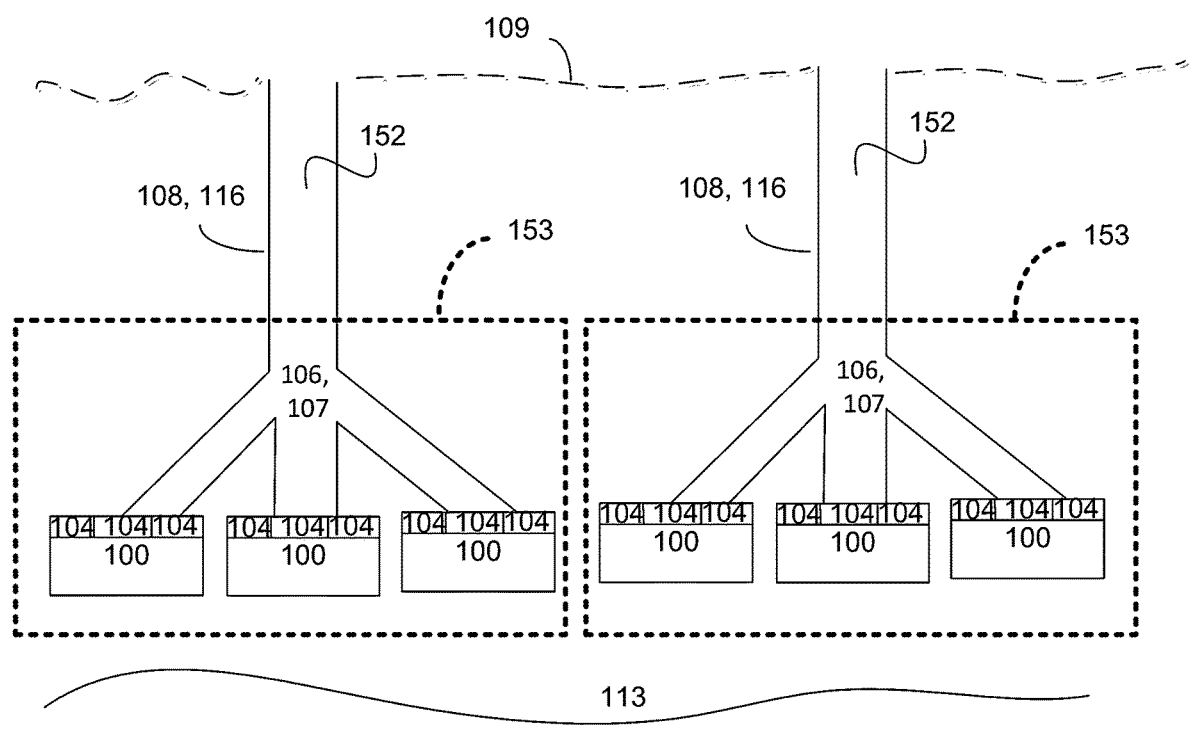
FIG. 8C is an illustration of a submerged buoyancy power system that leverages n+1 buoyancy power system engines that have n+1 Proton Exchange Membranes (PEM). This diagram uses 3 PEMs per a BPSE and shows 3 BPSEs in an interconnected configuration to amplify Hydrogen and Oxygen output. Two of the interconnected BPSE clusters as shown in FIG. 8A are run in parallel side by side to amplify the Hydrogen and Oxygen output to the surface.

A typical PEM from Treadwell corporation used in a BPSE is capable of producing 12,742.58 liters/hr of Hydrogen and ~6371 liters/hr of Oxygen. The use of the buoyant force (Fe) to re-charge the batteries in the BPSE to continue running the BPSE in time may reduce amount of external power needed to operate for the PEM system. One of these PEMs can produce ~80,790 gallons of Hydrogen a day, which may contain energy equivalent to 242,368 gallons of gasoline a day. PEMs 104 of this type can be used in n+1 configurations to amplify the volume of Hydrogen produced by the BPSE FIG. 8A. Three PEMs per a BSPE used in a three BPSE configuration as shown in FIG. 8A could produce 9× the output of Hydrogen a day totaling ~727,110 gallons of Hydrogen a day. The gasoline energy equivalent of FIG. 8A would be ~2,181,330 gallons of gasoline a day. Additionally, n+1 PEM subsystems in n+1 BSPE systems can be used to amplify the total output of Hydrogen power as in FIGS. 8A, 8B, and 8C. The BPSE architecture in FIG. 8B would have the capacity to produce ~1,454,220 gallons of Hydrogen a day which is equivalent to ~4,362,660 gallons of gasoline a day in energy terms. The USA used 391.73 million gallons of gasoline a day in 2016 according to the US Energy Information Administration. A total of 180 BPSE 153 configurations shown in FIG. may generate the Hydrogen energy equivalent of 392,639,400 gallons of gasoline per a day.

Figure 9A:
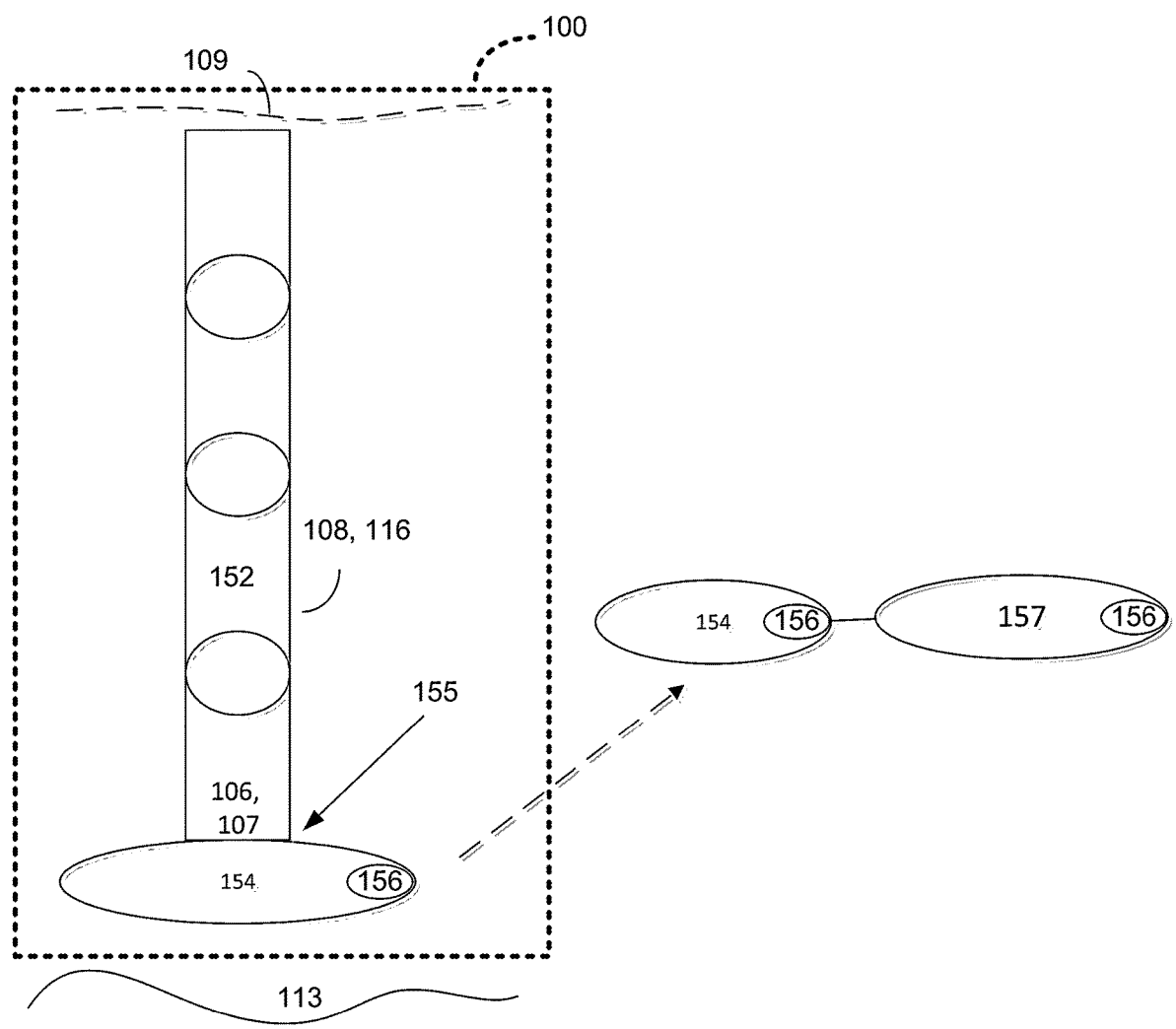
FIG. 9A is a BPSE that uses a modular submersible embodiment that contains the PEM, Reverse Osmosis, Power, and optional propulsion system. The submersible module is attached at the base of the BPSE plumbing and can either move or be towed to the surface by a submersible or tug.

The submersible structure that houses the RO & PEM of the BPSE can be modular in nature 154 as shown in FIG. 9A and can be exchanged from the BPSE plumbing configuration 152 at the base of the plumbing 155. These modular submersible structures 154 can be paired at the base of the BPSE plumbing for the purpose of providing n+1 feeds into the BPSE plumbing to the surface of the ocean or lake FIG. 9B. It is possible to place the BPSE into an artificial reservoir as well, but it must provide the ability to implement the submersible structure to house the RO & PEM system. The value of exchanging the submersible structure that houses the RO & PEM systems in the BPSE is that it enables maintenance to occur at the ocean surface or on land of the submersible structure. The ability to bring the submersible structures up to the surface allows them to be re-charged at the surface by conventional power such as solar, wind, etc. in the event that turbines are not being used by the BPSE system that generates Hydrogen & Oxygen to re-charge the batteries of the BPSE when batteries are used in the BPSE. Optionally, nuclear power can be used in the BPSE system for long periods of time. The BPSE system can be made to be portable so that it can feed ships, barges, and water craft capable of storing or using Hydrogen and/or Oxygen at sea or on a body of water. The portability of the BPSE may also be used for atmospheric condensation techniques required in different geographical regions of the earth at different times of the year for different purposes.

Figure 9B:
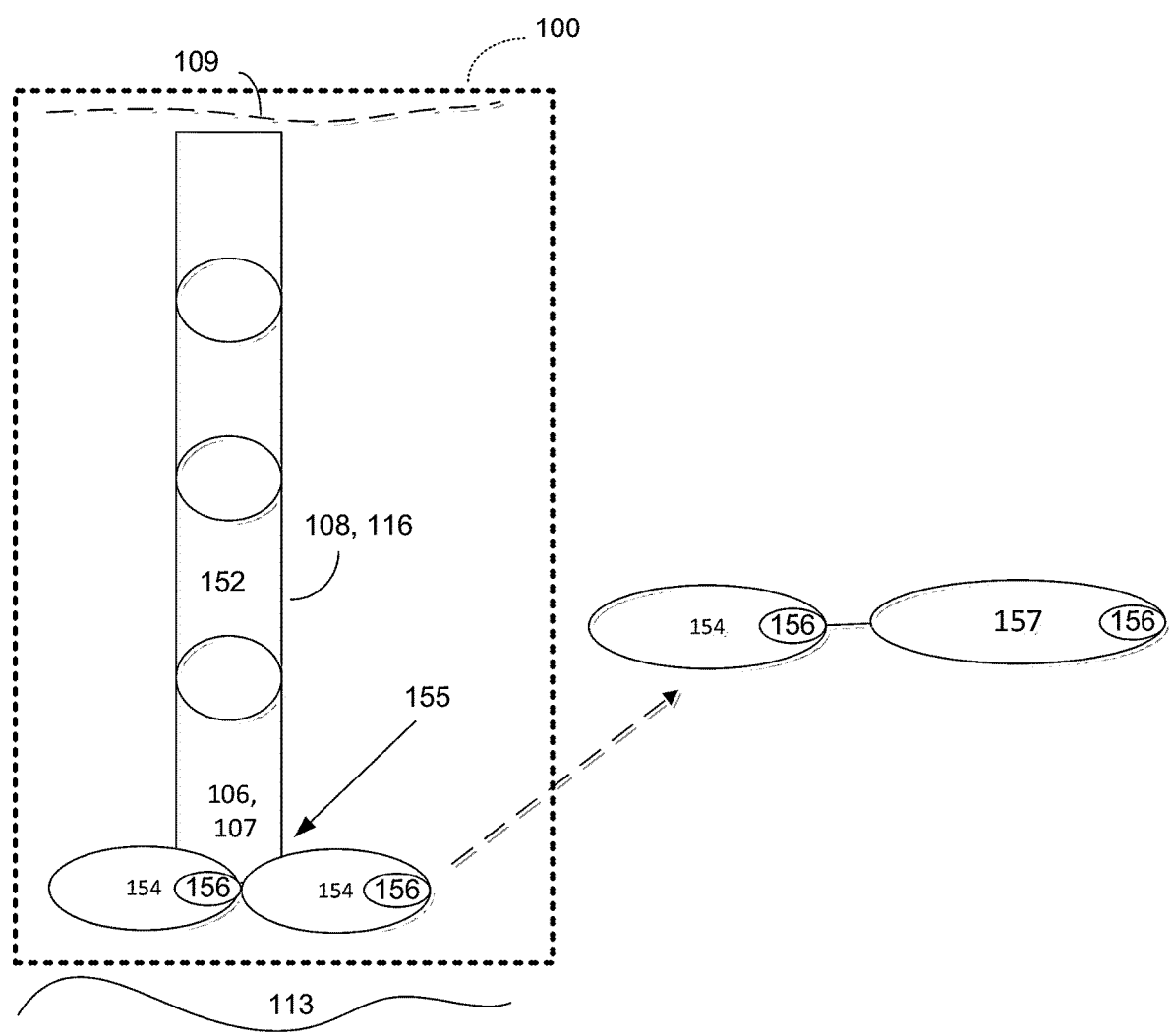
FIG. 9B is the same as FIG. 9A, but allows the modular submersible embodiment to be placed in an n+1 configuration at the base of the BPSE for the purpose of amplifying the Hydrogen and Oxygen output to the surface.
Figure 10:
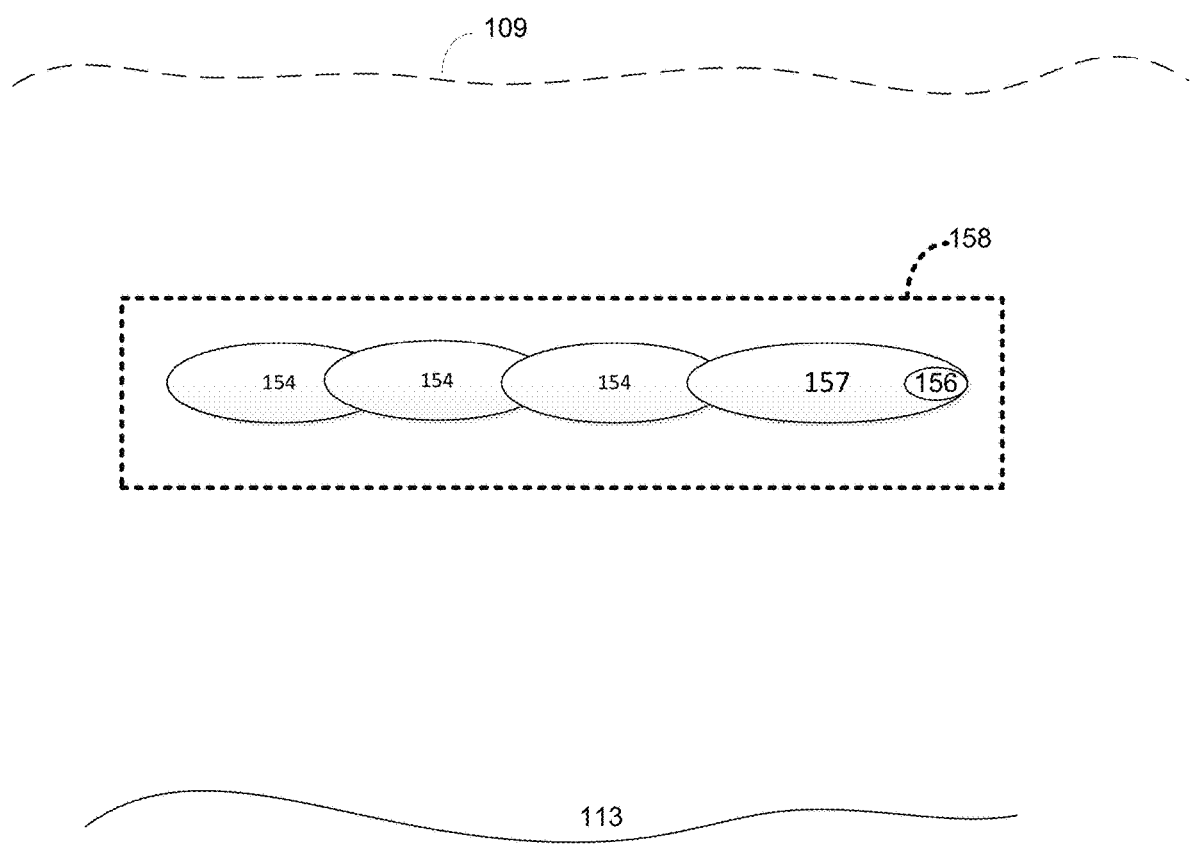
FIG. 10 is an illustration of n+1 modular submersible embodiment that contains the PEM, Reverse Osmosis, Power, and optional propulsion system that can be chained to a main module for additional power and propulsion capability. This configuration is streamlined for submersible transport of the n+1 modules.
Figure 11:
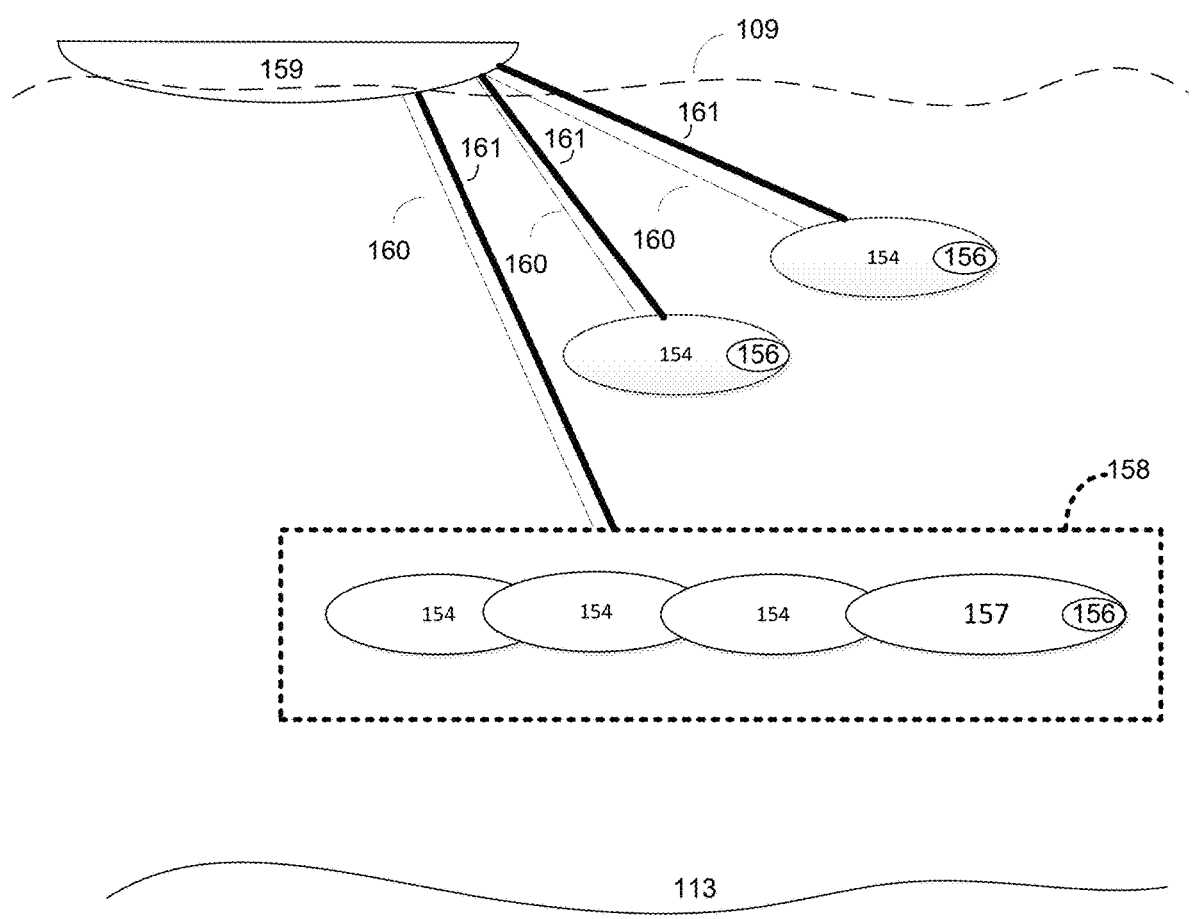
FIG. 11 is an illustration that shows n+1 modular submersible embodiment that contains the PEM, Reverse Osmosis, Power, and optional propulsion system that can be tethered in parallel to a ship, submersible, or other water craft at the surface of the body of water. The chained embodiment from FIG. 10 is illustrated as an optional tethered configuration to a ship, submersible, or other water craft at the surface of the body of water. Portability of BPSE configurations is stressed here.

A modular system 154 FIG. 9A and FIG. 9B can be used to configure the BPSE submersible structure that houses the RO & PEM subsystems. The modular submersible structure may or may not have a propulsion system 156. A submersible tug 157 can be used to move the modular submersible structure through the body of water. A chained configuration 158 of n+1 submersible structures 154 may be used in conjunction with a submersible tug 157 module to transport the n+1 submersible structures beneath and above the surface of an aqueous body of water FIG. 10. An aerodynamic submersible structure 154 may be used in order to create a chain linked structure 158 that can efficiently travel through water. Distribution of portable power from the submersible tug 157 using the architecture illustrated in 158 FIG. 10 provides the ability to have n+1 BPSE feeds to systems that are idle or moving. The submersible module(s) 154 may be tethered to the base of the BPSE to fix its position as in FIG. 9A and FIG. 9B. The submersible module(s) may also be tethered 160 to a ship, barge, water craft, or another submersible 159 in FIG. 11 for the purpose of providing Hydrogen & Oxygen feeds 161. Tethering 160 can also provide in-tow support of the submersible module 158 as the ship, barge, water craft, or another submersible 159 travels through the aqueous body of water in FIG. 11.

Figure 12:
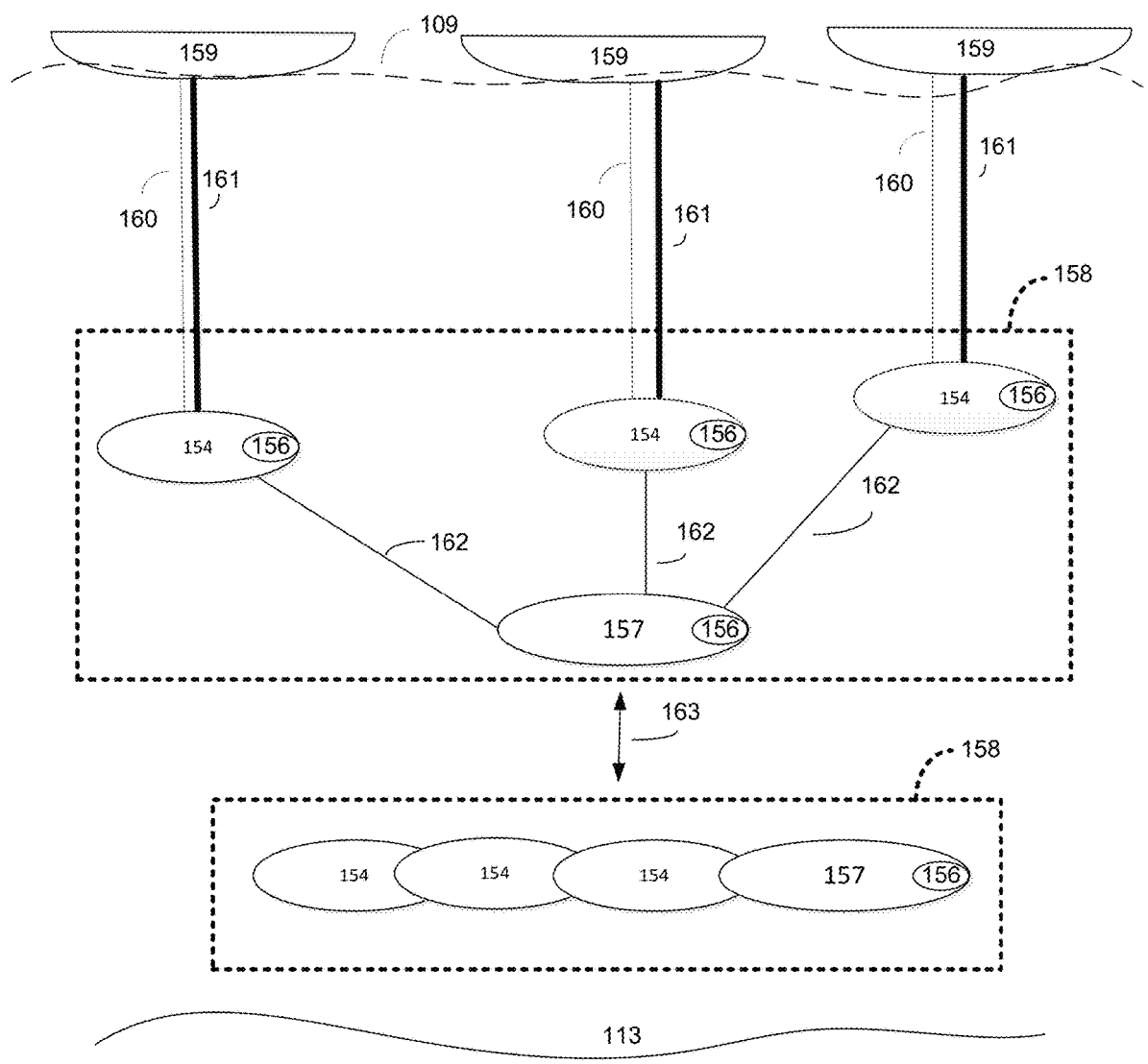
FIG. 12 is an illustration that shows n+1 modular submersible embodiment that contains the PEM, Reverse Osmosis, Power, and optional propulsion system that can transform from FIG. 11 parallel configuration into a tethered spread out configuration consisting of one or more ships, submersibles, or other water craft at the surface of the body of water.

The combined submersible architecture 158 may be configured such that the modular system 154 can separate 163 but remain powered by the main submersible tug 157 as shown in FIG. 12. Power connectivity 162 from the submersible tug 157 to the submersible modules 154 would enable Hydrogen & Oxygen generation in 154. Battery systems may be used in submersible modules 154 at times for power. The interconnected power configuration illustrated in FIG. 12 allows battery charging or continuous power from the primary submersible tug 157. Conventional power systems such as nuclear power can be used by the submersible tug 157. Use of a centralized power source 157 keeps the costs of Hydrogen & Oxygen production down when producing Hydrogen & Oxygen for n+1 water craft 159. The primary submersible tug 157 may connect and charge the n+1 submersible module(s) 154 battery systems and then release to perform other tasks without interrupting the Hydrogen & Oxygen generation to the downstream water craft 159.

The submerged nature of the BPSE described herein protects the power generation system from natural catastrophes such as hurricanes, floods, tidal waves, lightning, etc. The ability of the power generation system to operate under these conditions holds true as long as the output of Hydrogen is not threatened by structural damage. The BPSE can be shut down during catastrophic events and then re-started very easily in the event that risk to the Hydrogen plumbing system occurs. The key components of the system can be designed such that they are capable of withstanding the type of land based catastrophes that have occurred in the past. Earthquake resistant BPSE systems can be designed in such a way that only downstream terrestrial plumbing & systems are susceptible to the impacts of earthquakes. Tethering or buoyancy can be used to keep the BPSE systems from being directly fixed to the ocean floor in order to protect the BPSE system and it's plumbing from earthquakes & shifting. The BPSE can be raised and lowered during storms to protect the plumbing structures described herein.

Additionally, the submerged nature of the BPSE makes it difficult to reach. This can be strategic in nature relative to accessibility of the BPSE and provides additional security. The BPSE submerged components are more secure to attack. The location beneath the water reduces the risk of terrorism attacks on the BPSE. Typical land-based systems are easily accessible using conventional travel methods. In addition, conventional land-based attacks can disable a land-based power plant. The submerged nature of the BPSE reduces the ability to access the power generation system. Conventional attacks against the BPSE are not usable in the submerged environments. The capacity to reach submerged BPSE systems is difficult and expensive which limits the general population from easy accessibility that they have on land. Radar, sonar, and other conventional surveillance systems can be used to safeguard the submersible components of the BPSE.

Overall the BPSE creates a means to mine Hydrogen and Oxygen from the oceans of the earth in fixed, tethered, or portable structures. This solution provides a method of using buoyant force to produce additional power in the transmission of the Hydrogen and Oxygen gases downstream without losing energy to heat or electrical resistance and without imposing a detriment to availability of amount of hydrogen produced by a PEM, or similar device other as compared to availability of amount hydrogen to the other uses if energy from the buoyant force action on the Hydrogen was not captured before the uses of the Hydrogen. Water vapor can be generated using the buoyant force generated by burning Hydrogen & Oxygen created by a BPSE. Hydrogen provides a turn-key mechanism that can be used with Hydrogen fuel cells or hydro power to create additional power on land. Hydrogen can be diluted using combustible or inert gases to reduce the burn rate in the presence of Oxygen. Nitrogen diluted Hydrogen can be used as an energy source to fuel combustion engines that burn fuels at lower rates than Hydrogen and Oxygen alone. Hydrogen and diluted Hydrogen can be used as a Gas-To-Fuel ("GTF") energy source to synthetically make carbon-based fuels and lubricants using Sabatier+Fischer Tropsch methods. The traditional yields from the GTF methods can be improved to more efficiently produce synthetic fuels and lubricants.

Some embodiments have been described herein with a focus on a Hydrogen buoyancy engine that captures energy from a buoyancy force acting on a flow of Hydrogen in a Hydrogen plumbing system received from a Hydrogen and Oxygen separator, such as a PEM or other type of water electrolysis device, a Hydrogen converter, and capturing Hydrogen buoyancy force without reducing an amount of work or potential energy that may be contained in the flow of Hydrogen. It will be appreciated that energy from a buoyant force acting on a flow of Oxygen gas from the Hydrogen and Oxygen separator may also be captured in a similar manner, using similar components such as an Oxygen buoyancy engine, an Oxygen convertor and an Oxygen plumbing system.

What is claimed is:

1. A system, comprising: at least one plumbing component, configured to provide at least one partially-buoyancy motivated flow of Hydrogen gas to at least one gas-to-fuel ("GTF") process, wherein the partially-buoyancy motivated flow of Hydrogen gas partially results from at least one reverse osmosis device located below the surface of a body of water such that gravity facilitates forcing water from the body of water through the reverse osmosis device to result in purified water, wherein the at least one partially-buoyancy motivated flow of Hydrogen gas is generated based on the purified water.

2. The system of claim 1, wherein the at least one reverse osmosis device is located at a first elevation, wherein the at least one GTF process occurs at a second elevation that is higher than the first elevation, and wherein the at least one partially-buoyancy-motivated flow of Hydrogen gas rises via the at least one plumbing component from the first elevation to the second elevation, wherein the Hydrogen gas is used at the second elevation as a source of protons to the at least one GTF process.

3. The system in claim 1, wherein the at least one partially-buoyancy motivated flow of Hydrogen gas is combined with Oxygen from atmospheric air to create electricity at a higher elevation than an elevation where the Hydrogen gas is provided to the at least one plumbing component, wherein the electricity is used to facilitate the at least one GTF process.

4. The system of claim 1, wherein the system further comprises:
a Hydrogen-producing device that is capable of receiving electrical power from an electrical power source;
wherein the electrical power results from using the Hydrogen gas to produce electrical charge that is added to a battery that is capable of providing power to the Hydrogen-producing device that produces the at least one partially-buoyancy-motivated flow of Hydrogen gas.

5. The system of claim 1, wherein the Hydrogen gas is used to generate heat that is usable to facilitate the at least one GTF process.

6. The system of claim 1, wherein the at least one GTF process comprises at least one of: at least one Sabatier process, at least one Fisher-Tropsch process, or at least one Sabatier plus Fisher-Tropsch process.

7. The system of claim 1, wherein the at least one plumbing component comprises a first plumbing component configured to provide the at least one partially-buoyancy motivated flow of Hydrogen gas to the at least one GTF process and a second plumbing component configured to provide at least one partially-buoyancy motivated flow of Oxygen gas to the at least one GTF process, wherein the Hydrogen gas and the Oxygen gas are usable to facilitate the at least one GTF process.

8. The system of claim 1, wherein a submersible module comprises the at least one reverse osmosis device, and wherein the at least one plumbing component is adapted to facilitate interchangeably attaching the submersible module to the at least one plumbing component.

9. The system of claim 8, wherein the submersible module is a first submersible module, wherein the at least one reverse osmosis device is a first reverse osmosis device, wherein the at least one partially-buoyancy motivated flow of Hydrogen gas is a first partially-buoyancy motivated flow of Hydrogen gas, wherein the at least one plumbing component is a first plumbing component, and wherein the system further comprises:
a second submersible module, comprising a second reverse osmosis device, interconnected with the first submersible module and adapted to provide a second partially-buoyancy motivated flow of Hydrogen gas to the first plumbing component; and
a third submersible module, comprising a third reverse osmosis device, adapted to provide a third partially-buoyancy motivated flow of Hydrogen gas to second plumbing component of the at least one plumbing component.

10. The system of claim 9, wherein the at least one plumbing component is further configured to facilitate the Hydrogen gas being used to generate electricity.

11. A system, comprising:
at least one hydrolysis device that receives electrical power from at least one electrical power source;
at least one reverse osmosis device that provides purified water to the at least one hydrolysis device; and
at least one plumbing component via which partially-buoyancy motivated Hydrogen gas is provided to at least one gas-to-fuel ("GTF") process,
wherein weight of water due to gravity at least partially forces water through the at least one reverse osmosis device to result in the purified water, wherein the at least one hydrolysis device generates the partially-buoyancy motivated Hydrogen gas based on the purified water, and wherein the partially-buoyancy motivated Hydrogen gas is provided from the at least one hydrolysis device to the at least one GTF process, via the at least one plumbing component without pumping, at at least one elevation that is higher than the at least one hydrolysis device.

12. The system of claim 11, wherein the at least one partially-buoyancy motivated flow of Hydrogen gas is combined with Oxygen from atmospheric air to create electricity at a higher elevation than the Hydrogen gas is provided, by the at least one hydrolysis device, to the at least one plumbing component, wherein the electricity is used to facilitate the at least one GTF process.

13. The system of claim 11, wherein the electrical power source is a mobile electrical power source.

14. The system of claim 12, wherein the at least one GTF process processes the Hydrogen gas to produce acidic protons.

15. The system of claim 12, wherein the at least one GTF process processes the Hydrogen gas to produce heat.

16. A method, comprising:
providing at least one hydrolysis device, adapted to receive electrical power from an electrical power source, and at least one reverse osmosis device that provides purified water to the at least one hydrolysis device at a first elevation below the surface of a body of water such that weight of the water due to gravity forces water through the reverse osmosis device; and
wherein an output of the at least one hydrolysis device provides at least one flow of Hydrogen gas that is directed to at least one gas-to-fuel process ("GTF") at a second elevation that is higher than the first elevation without additional pumping.

17. The method of claim 16, wherein the second elevation is the surface of the body of water, the method further comprising:
tethering, to a watercraft that is floating at the second elevation, the at least one hydrolysis device, wherein the at least one flow of Hydrogen gas is provided to the watercraft.

18. The method of claim 17, further comprising:
providing a plumbing system, wherein the plumbing system directs the at least one flow of Hydrogen from the Hydrolysis device to the watercraft.

19. The method of claim 16, wherein the at least one flow of Hydrogen gas is used to generate electricity before being used by the at least one GTF process.

20. The method of claim 16, wherein the Hydrogen gas is used as a feed stock to the GTF process.

* * * * *